US010466794B2

(12) United States Patent
Maeda et al.

(10) Patent No.: US 10,466,794 B2
(45) Date of Patent: Nov. 5, 2019

(54) GESTURE RECOGNITION AREAS AND SUB-AREAS FOR INTERACTION WITH REAL AND VIRTUAL OBJECTS WITHIN AUGMENTED REALITY

(71) Applicant: SONY CORPORATION, Tokyo (JP)

(72) Inventors: Yoshinori Maeda, Kanagawa (JP); Jun Yokono, Tokyo (JP); Katsuki Minamino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 650 days.

(21) Appl. No.: 14/775,776

(22) PCT Filed: Dec. 11, 2013

(86) PCT No.: PCT/JP2013/007295
§ 371 (c)(1),
(2) Date: Sep. 14, 2015

(87) PCT Pub. No.: WO2014/147686
PCT Pub. Date: Sep. 25, 2014

(65) Prior Publication Data
US 2016/0034039 A1 Feb. 4, 2016

(30) Foreign Application Priority Data

Mar. 21, 2013 (JP) ................................. 2013-058858

(51) Int. Cl.
*G06F 3/01* (2006.01)
*G02B 27/01* (2006.01)
(Continued)

(52) U.S. Cl.
CPC ........... *G06F 3/017* (2013.01); *G02B 27/017* (2013.01); *G06F 3/011* (2013.01); *G06F 3/0482* (2013.01);
(Continued)

(58) Field of Classification Search
CPC ........ G06F 3/011; G06F 3/017; G06F 3/0482; G06F 3/04842; G02B 27/017;
(Continued)

(56) References Cited

U.S. PATENT DOCUMENTS 7,394,459 B2 * 7/2008 Bathiche ................. G06F 3/011
345/156
2008/0150899 A1 * 6/2008 Lin ......................... G06F 3/011
345/168
(Continued)

OTHER PUBLICATIONS

"Flash Android Touch Checker" by steveonjava, from http://steveonjava.com/-flash-android-touch-checker/ published on Jun. 16, 2011 (7 pages).*

*Primary Examiner* — Eric J. Bycer
(74) *Attorney, Agent, or Firm* — Chip Law Group

(57) ABSTRACT

An information processing apparatus includes circuitry that is configured to provide a user interface to control a plurality of controllable objects. The user interface is associated with a gesture recognition area that is defined by a predetermined detection area of a sensor. The gesture recognition area is divided into a plurality of gesture recognition sub-areas based on a number of the controllable objects to be controlled by the user interface. The circuitry is further configured to detect a predetermined gesture within the predetermined detection area, determine the gesture recognition sub-area in which the predetermined gesture is detected, and perform an operation on one of the controllable objects based on the detected predetermined gesture and the determined gesture recognition sub-area in which the predetermined gesture is detected.

18 Claims, 27 Drawing Sheets

(51) Int. Cl.
*G06F 3/0482* (2013.01)
*G06F 3/0484* (2013.01)

(52) U.S. Cl.
CPC .... *G06F 3/04842* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ...... G02B 2027/0138; G02B 2027/014; G02B 2027/0178; G02B 2027/0187
See application file for complete search history.

(56) References Cited

U.S. PATENT DOCUMENTS

| | | | |
|---|---|---|---|
| 2010/0091096 A1* | 4/2010 | Oikawa | G06F 3/011 348/53 |
| 2011/0138285 A1* | 6/2011 | Kuo | G06F 3/017 715/727 |
| 2011/0197263 A1* | 8/2011 | Stinson, III | G06F 3/011 726/4 |
| 2012/0154557 A1* | 6/2012 | Perez | H04N 21/25891 348/53 |
| 2013/0156266 A1* | 6/2013 | Horii | G06F 3/012 382/103 |
| 2014/0132484 A1* | 5/2014 | Pandey | G02B 27/0172 345/8 |
| 2014/0168262 A1* | 6/2014 | Forutanpour | G06T 19/006 345/633 |
| 2014/0184550 A1* | 7/2014 | Hennessey | G06F 3/013 345/173 |

* cited by examiner

[Fig. 1]
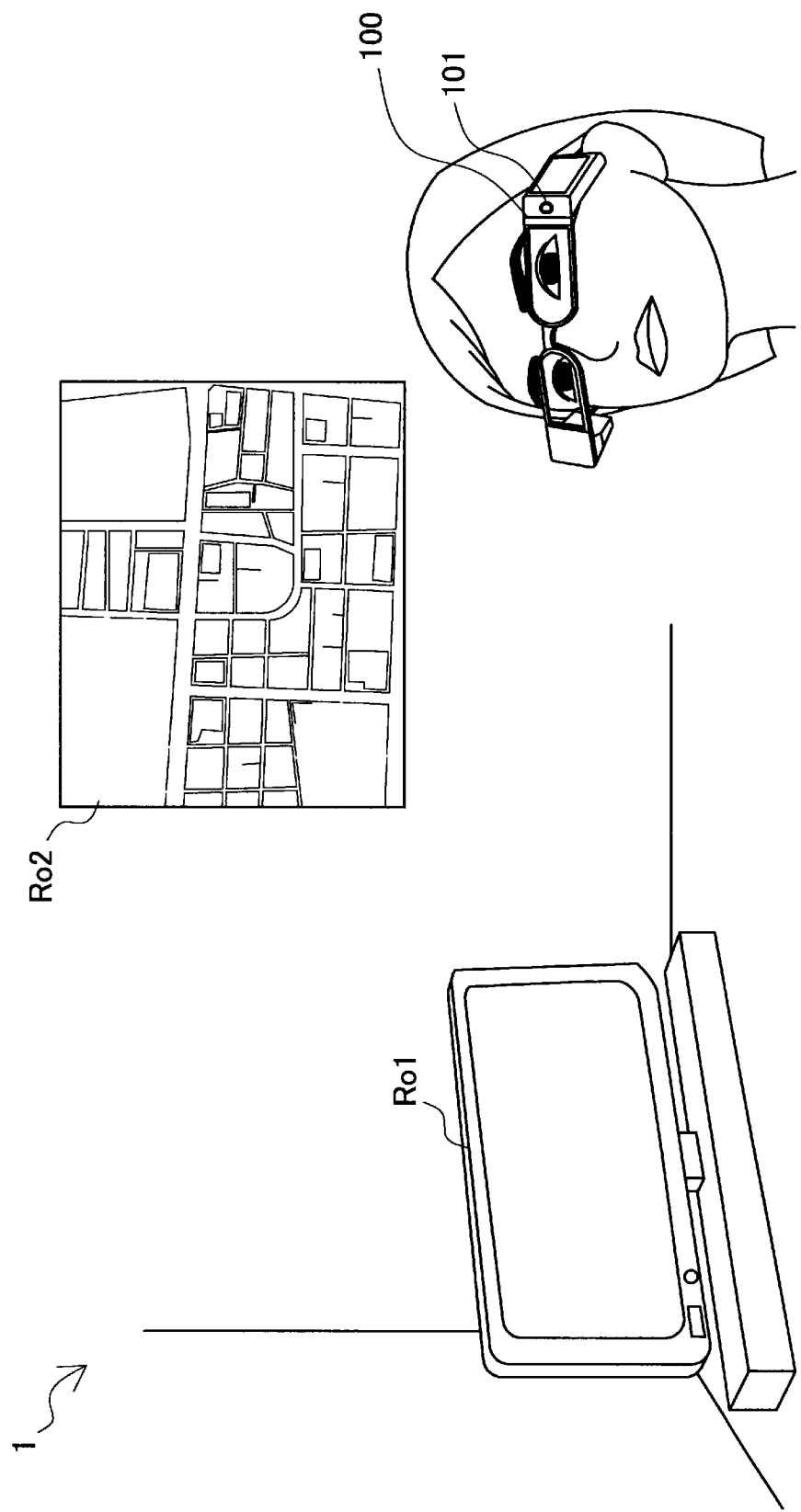

[Fig. 2]
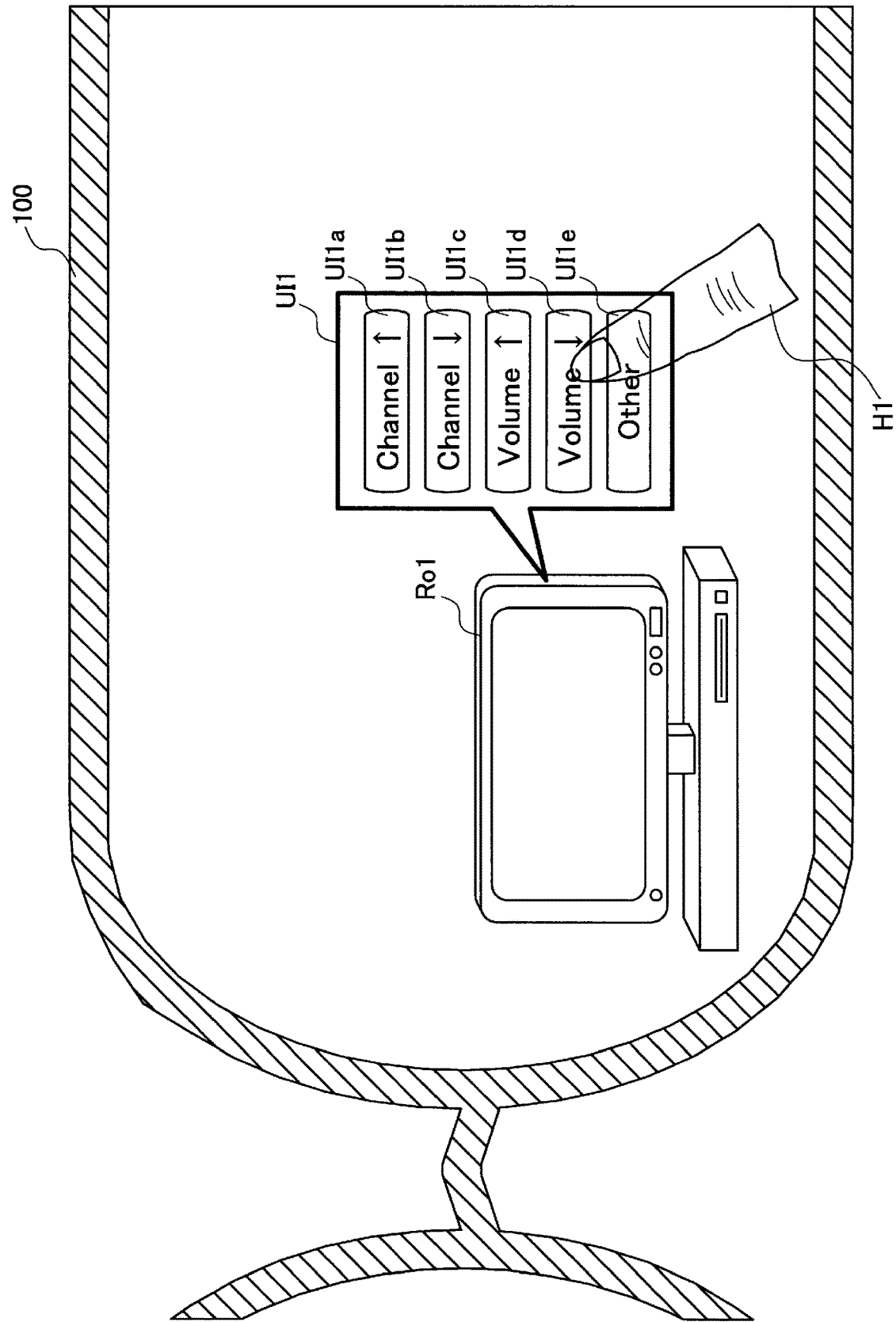

[Fig. 3]
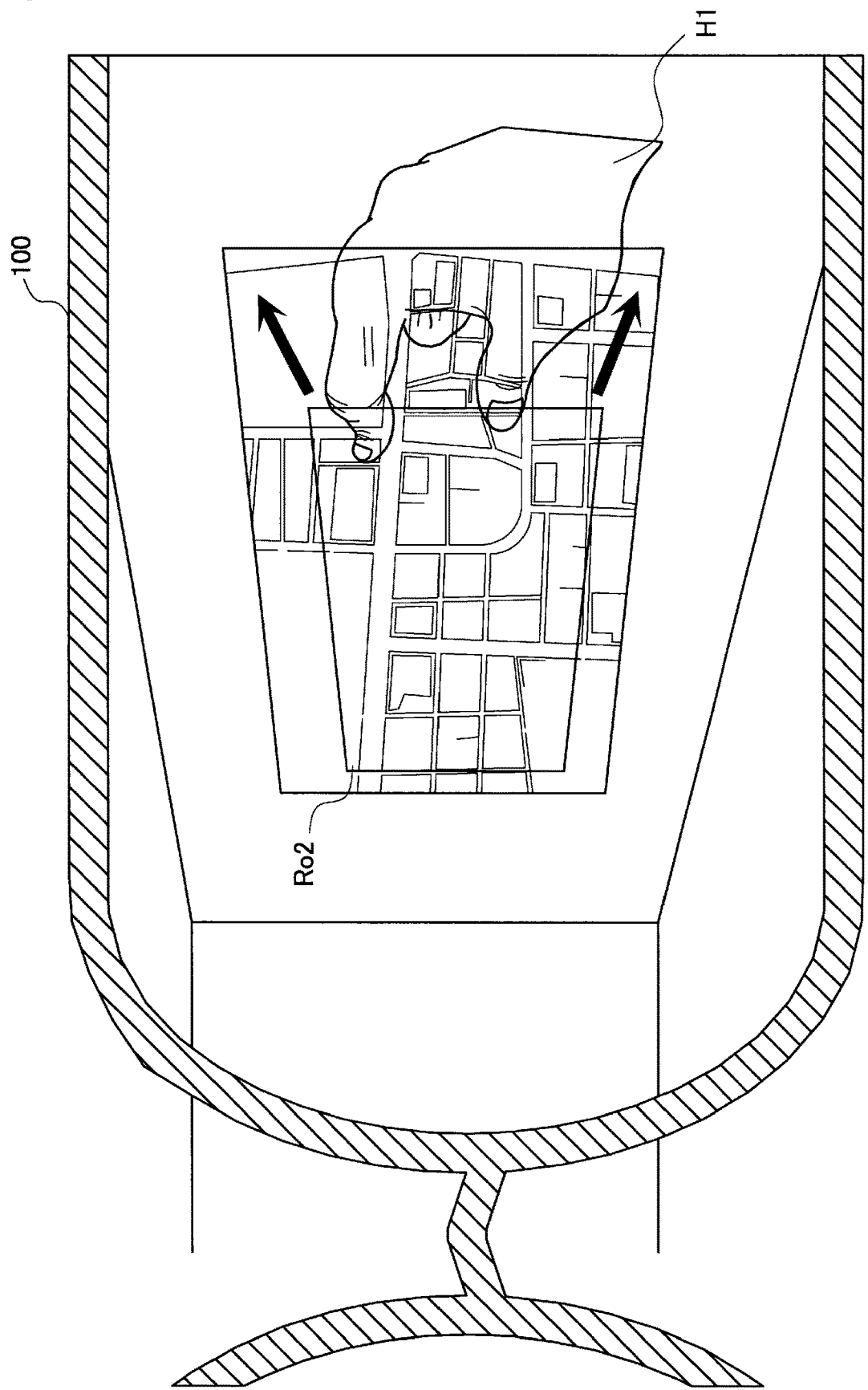

[Fig. 4]
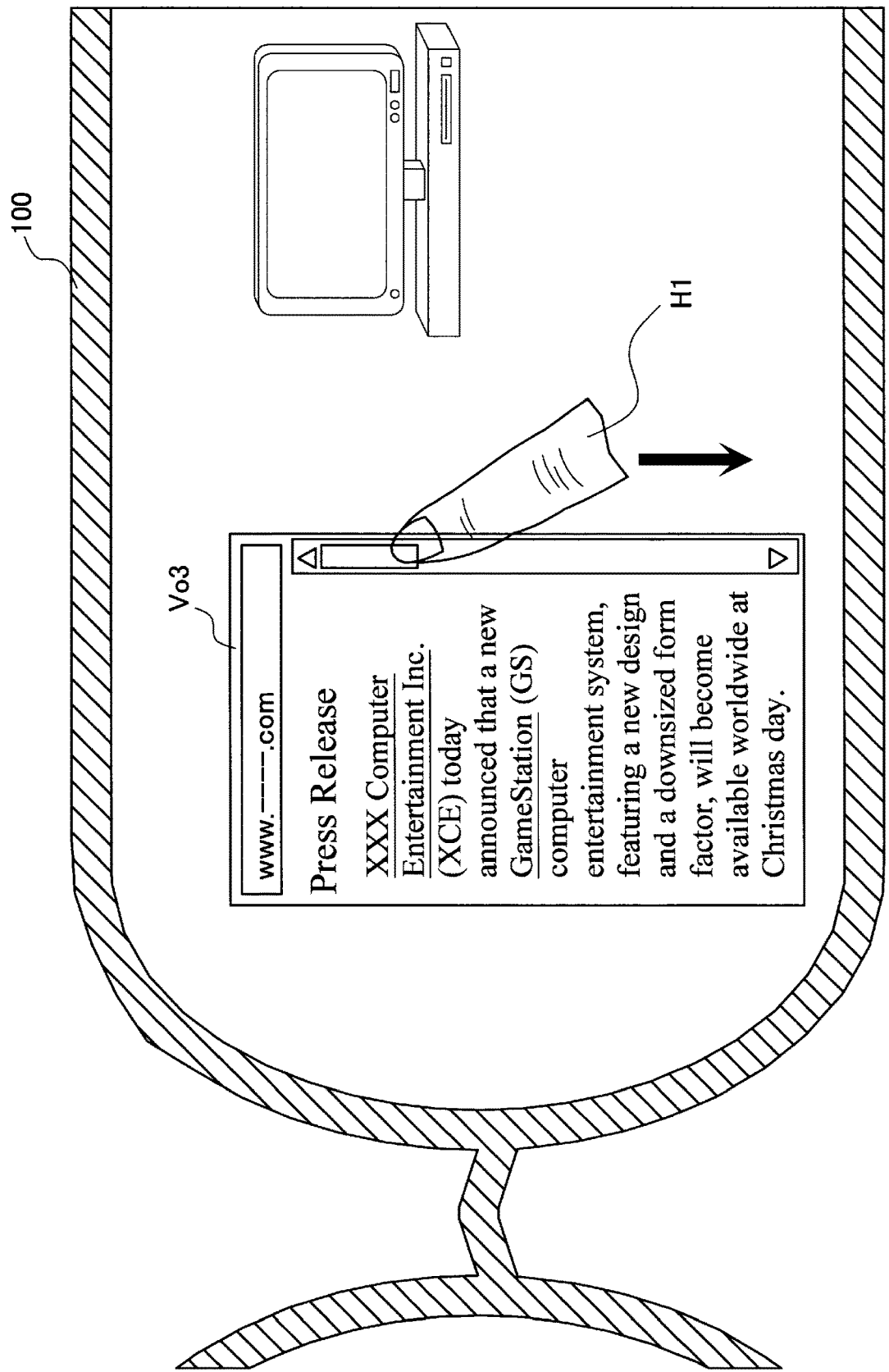

[Fig. 5]
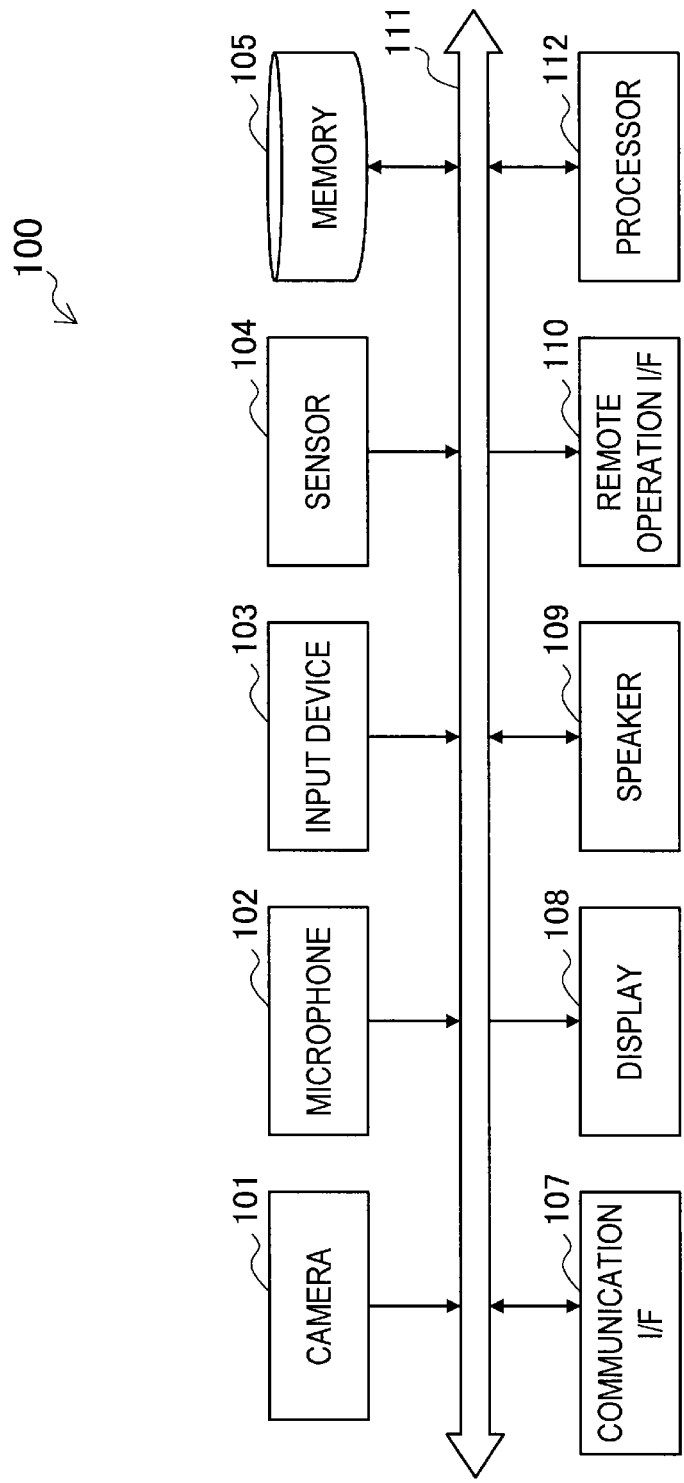

[Fig. 6]
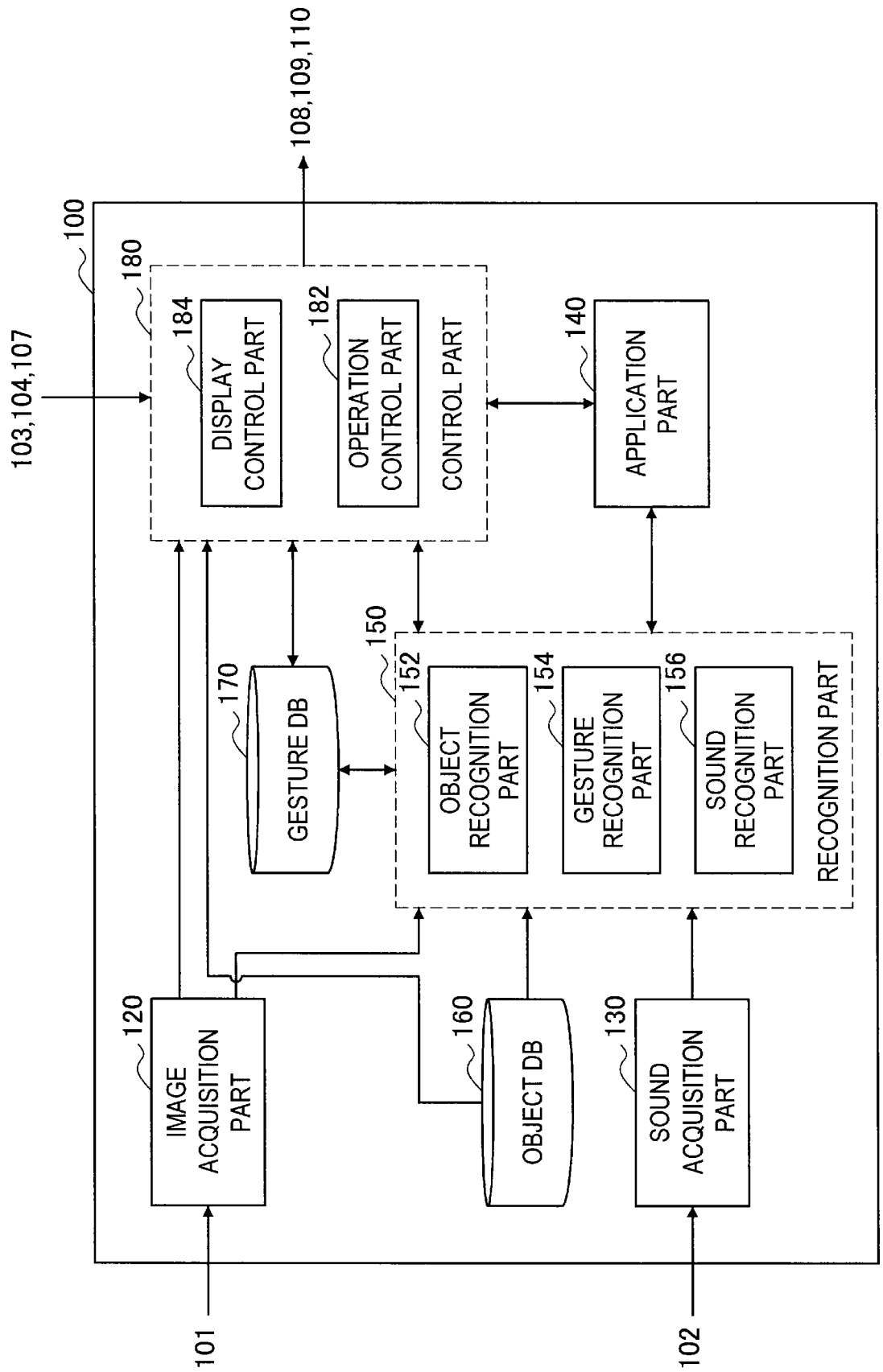

[Fig. 7A]
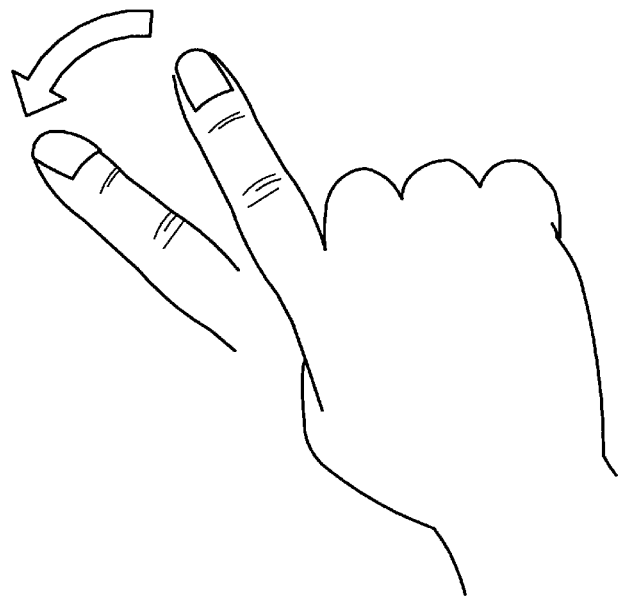
G1 : FingerTouch
[Fig. 7B]
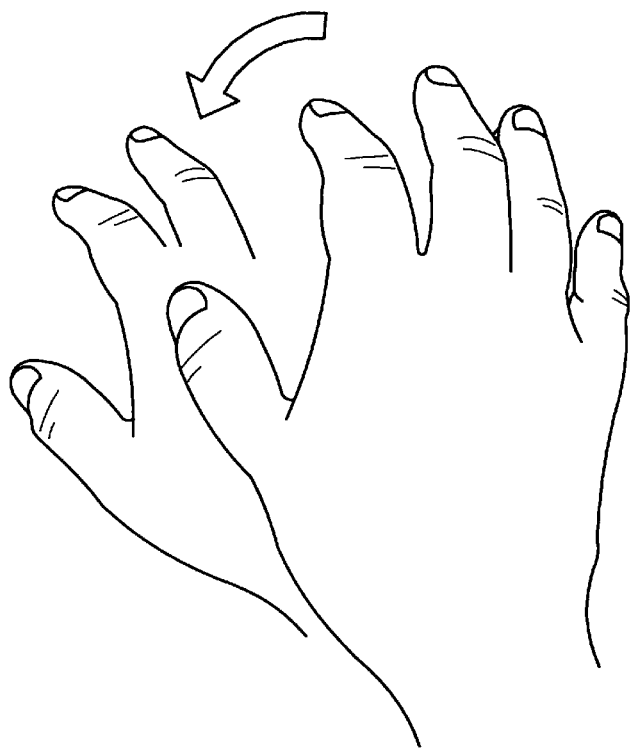
G2 : PalmTouch

[Fig. 7C]
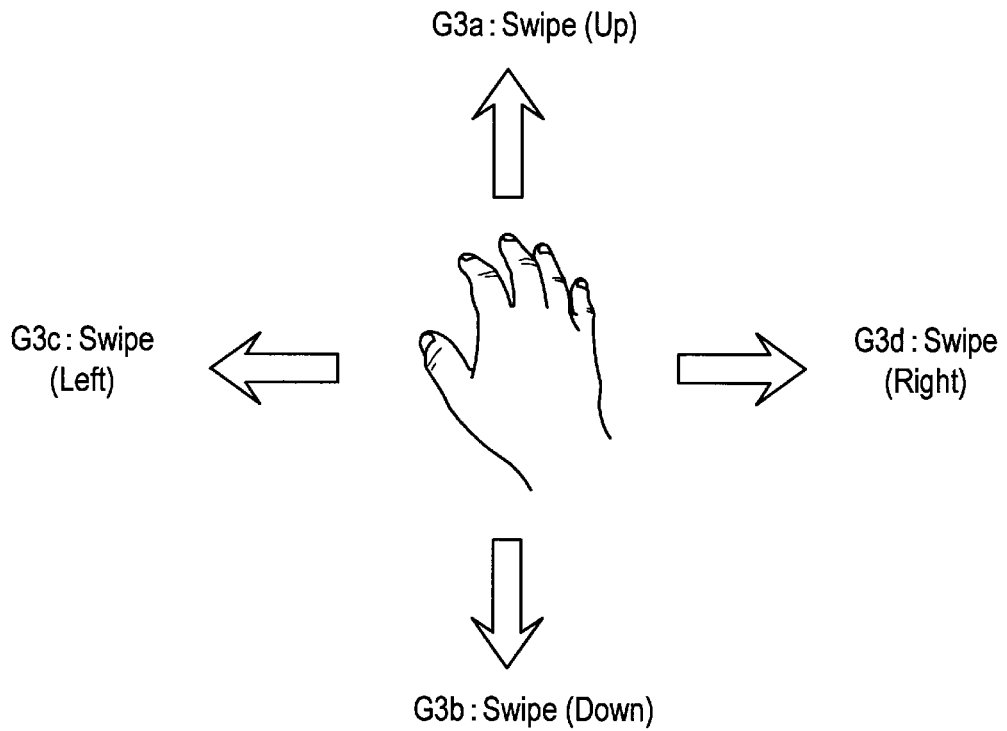
[Fig. 7D]
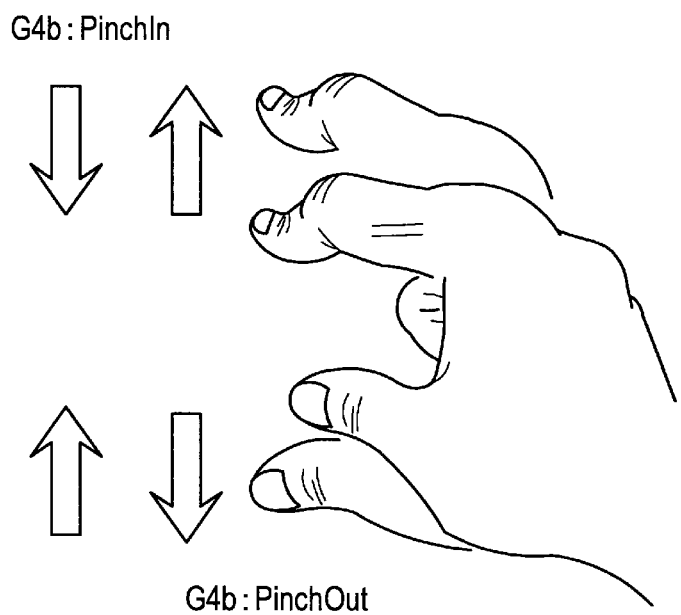

[Fig. 7E]
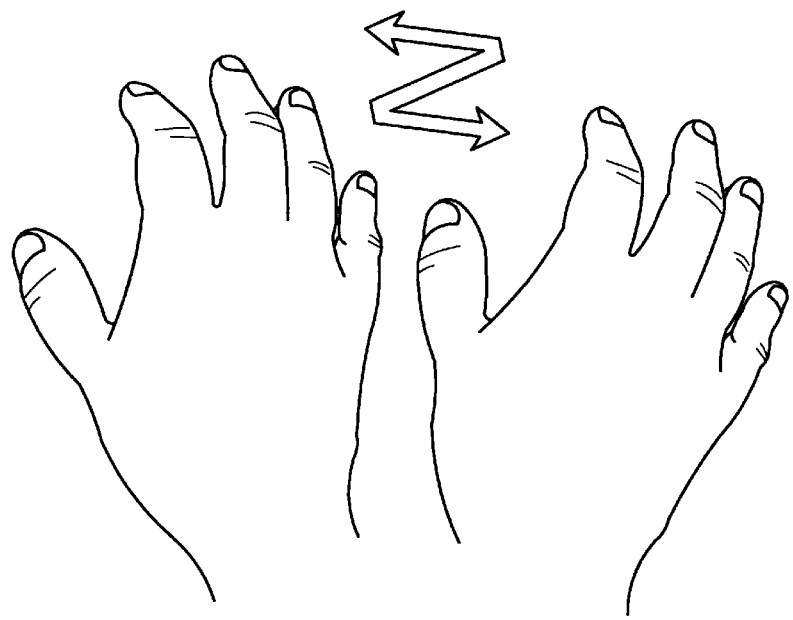
G5 : Wave
[Fig. 7F]
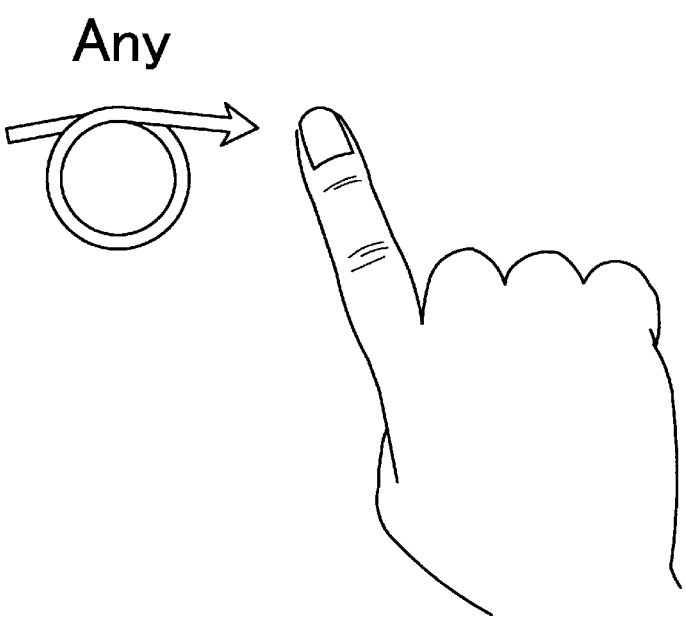
G6 : SpecificGesture

[Fig. 8]
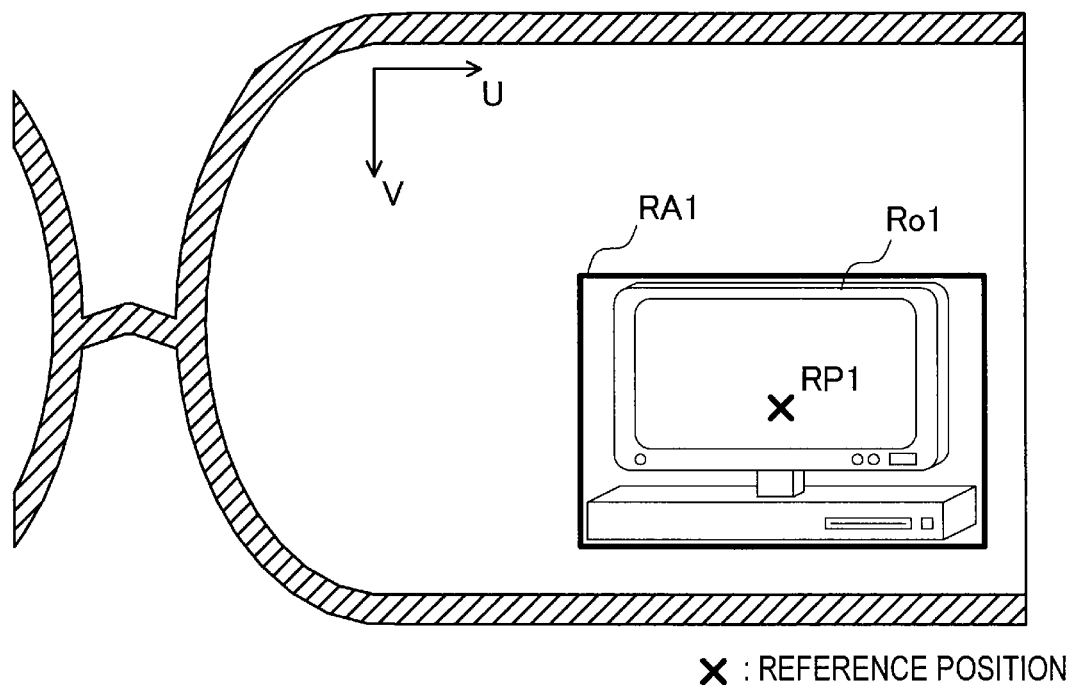
[Fig. 9]
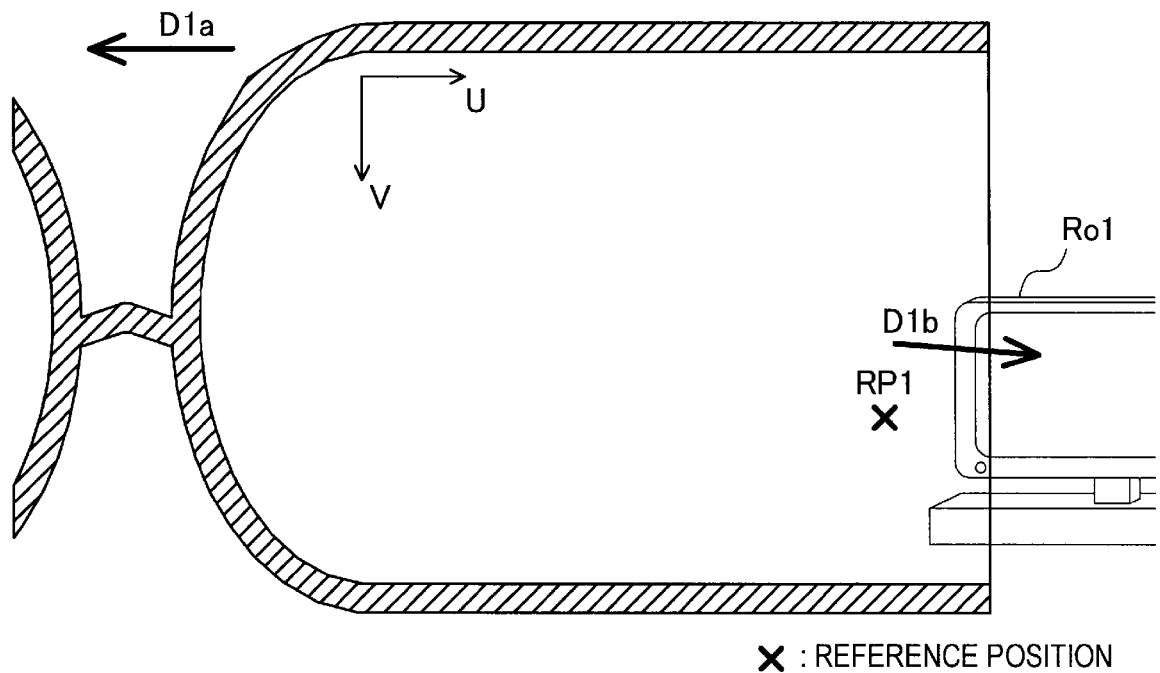

[Fig. 10]
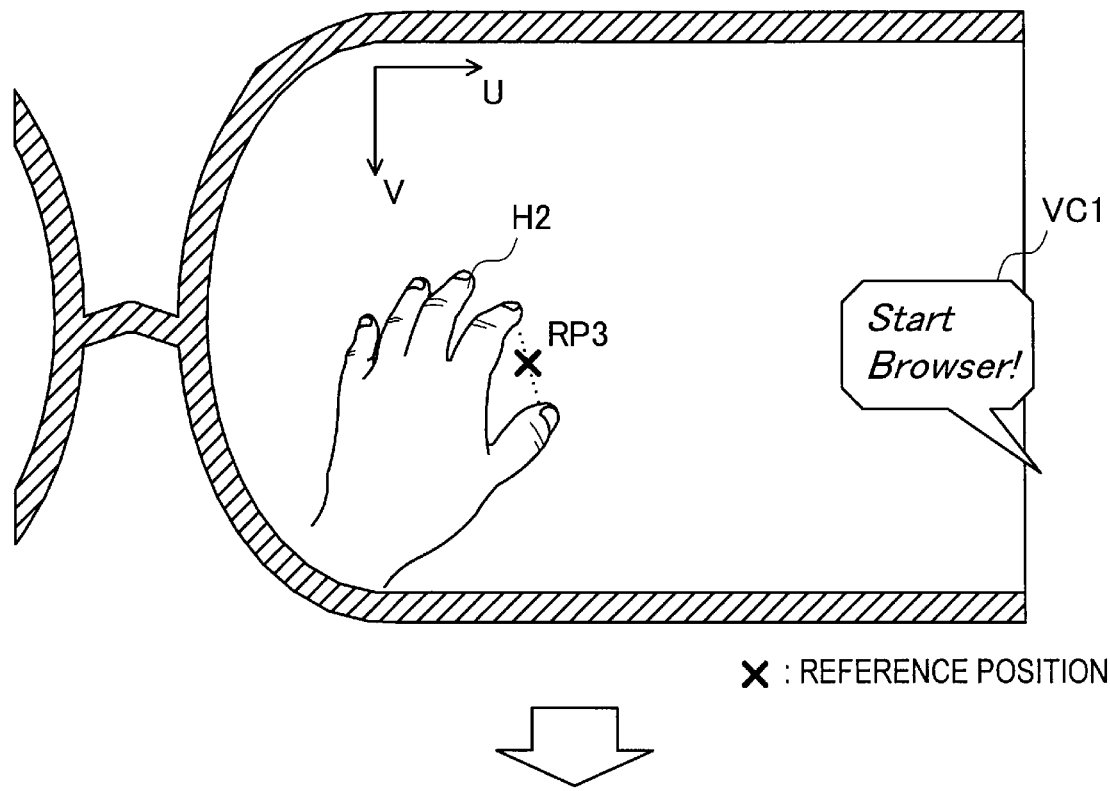
✗ : REFERENCE POSITION
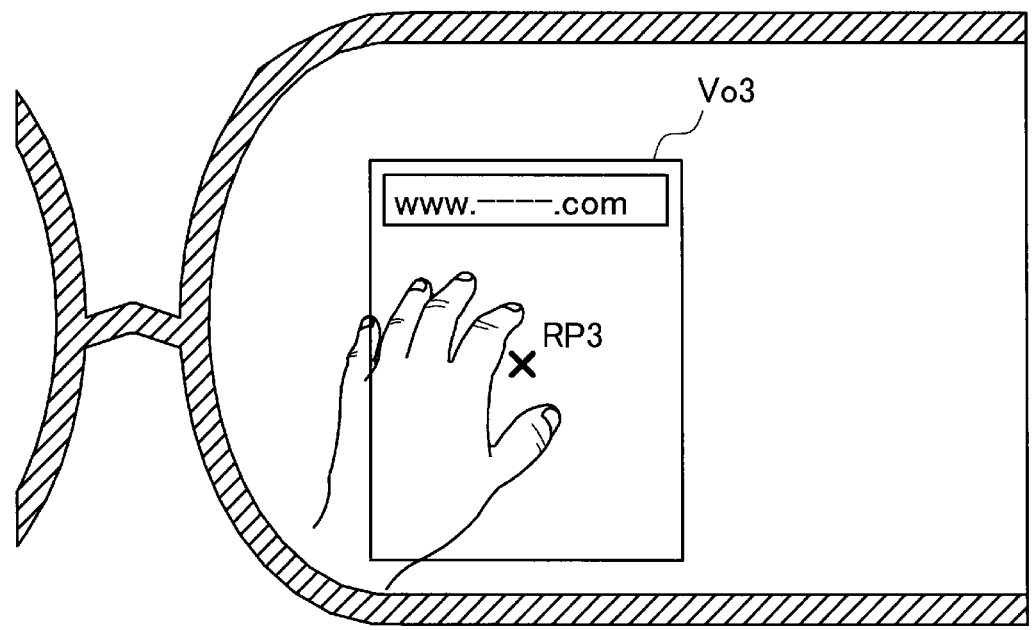

[Fig. 11]
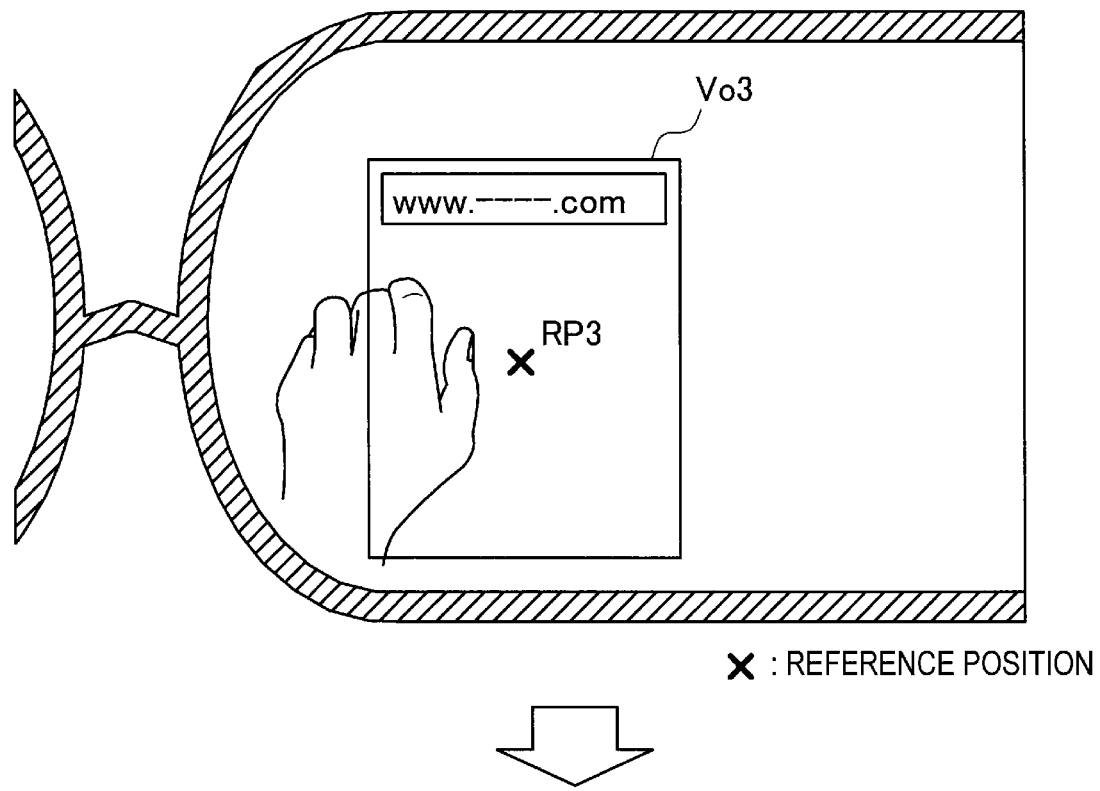
✗ : REFERENCE POSITION
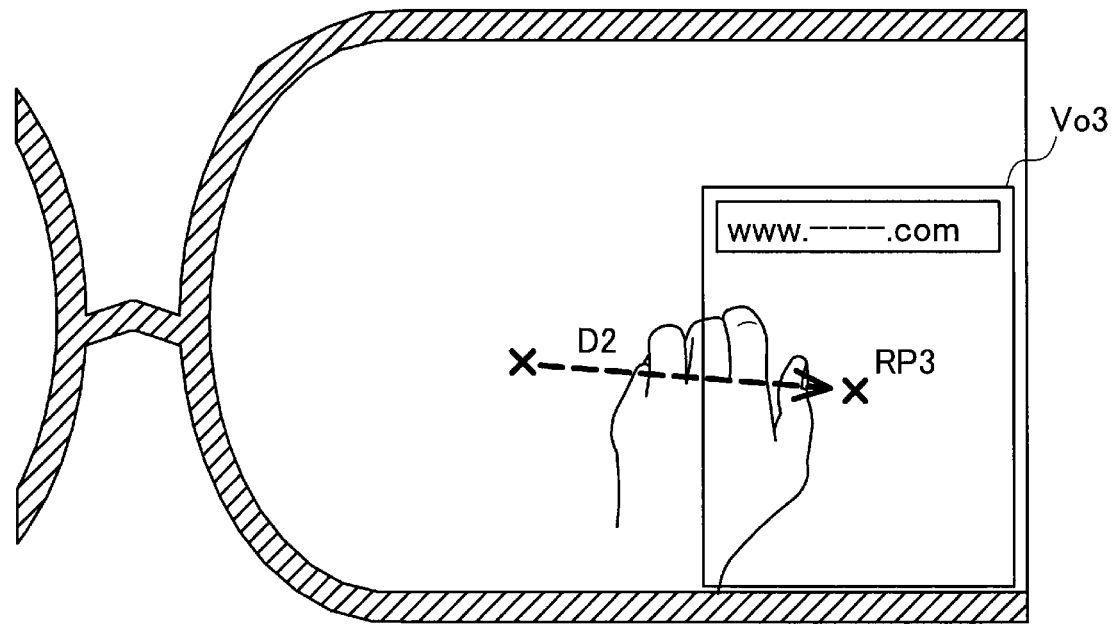

[Fig. 12]
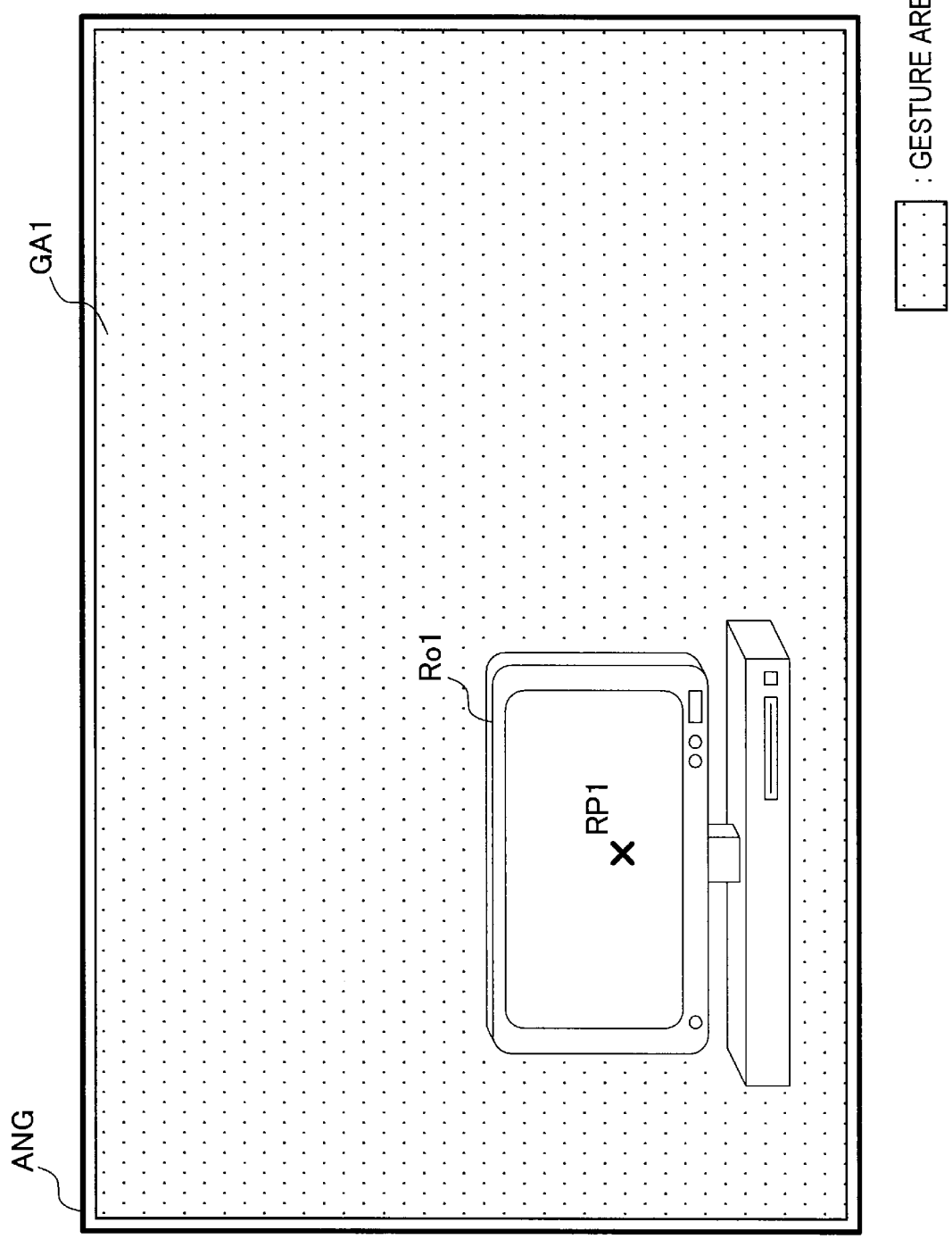

[Fig. 13A]
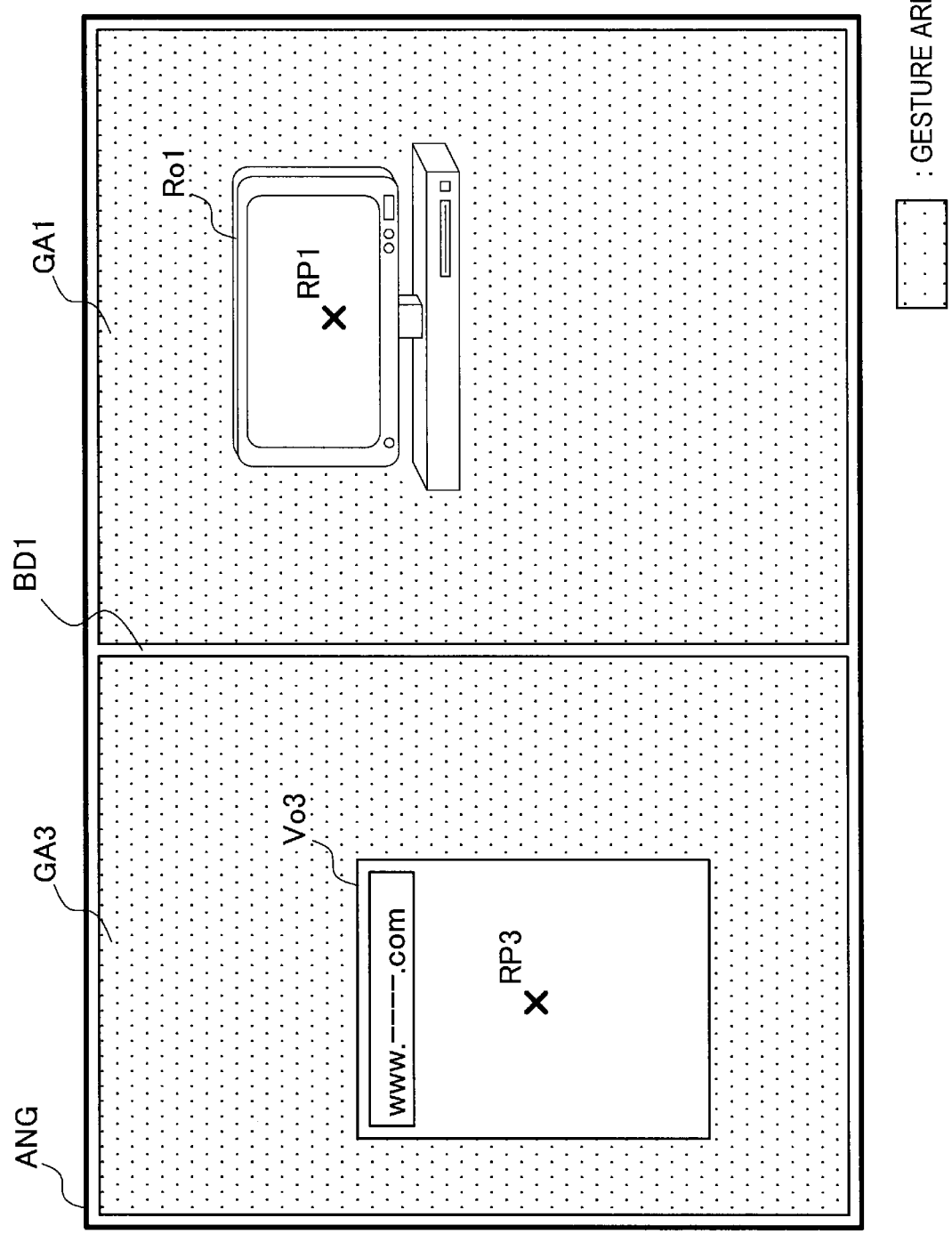

[Fig. 13B]
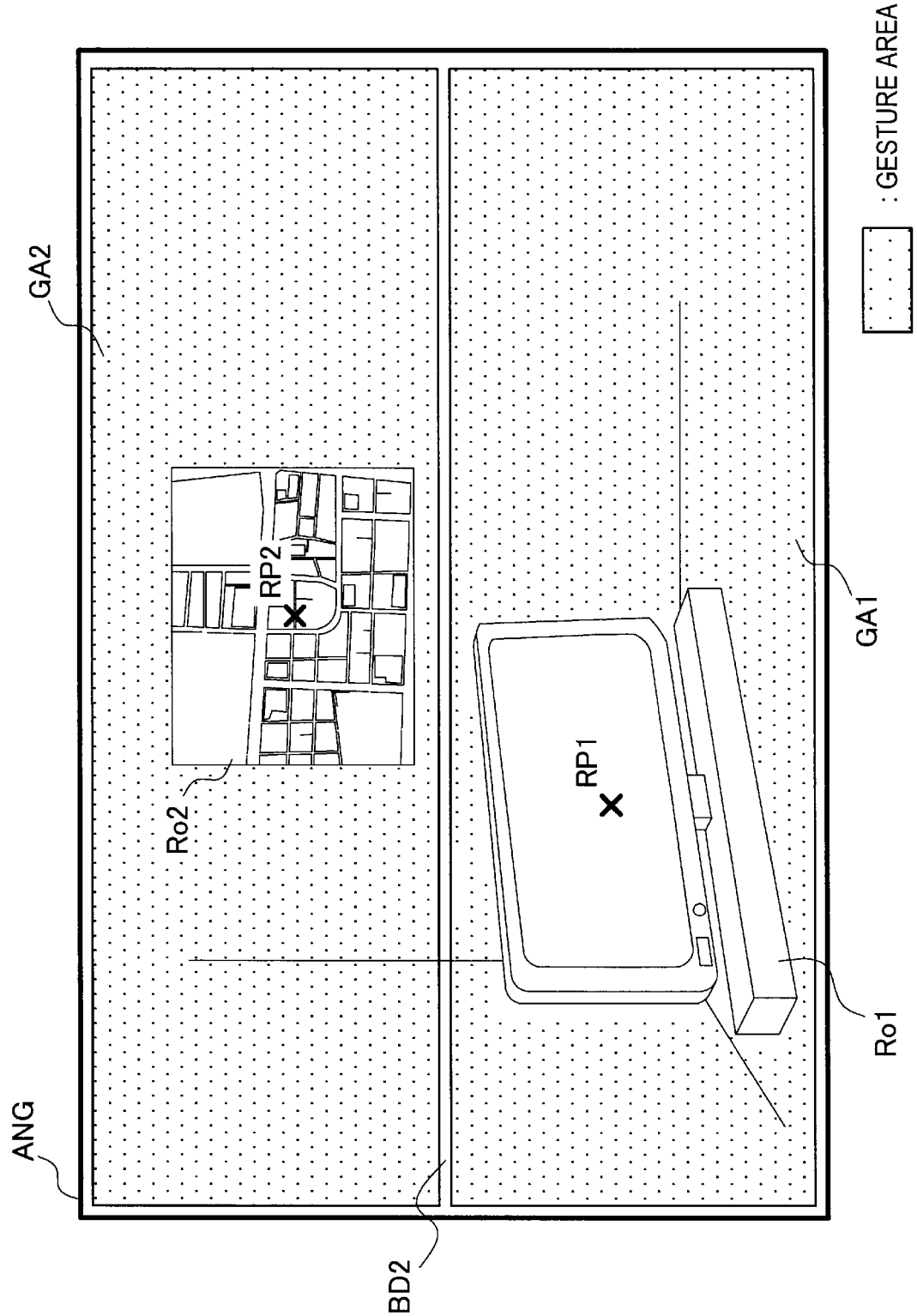

[Fig. 14]
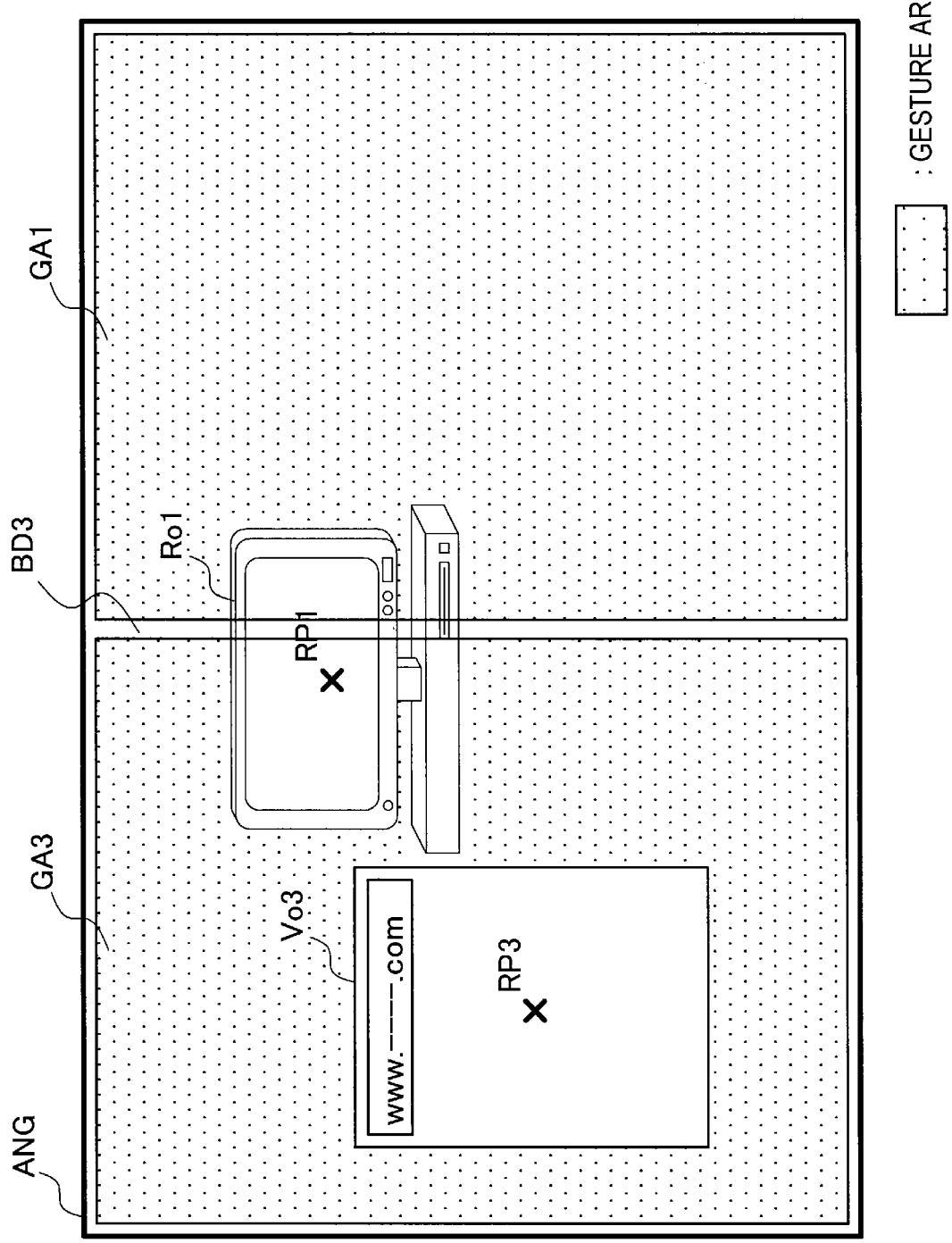

[Fig. 15]
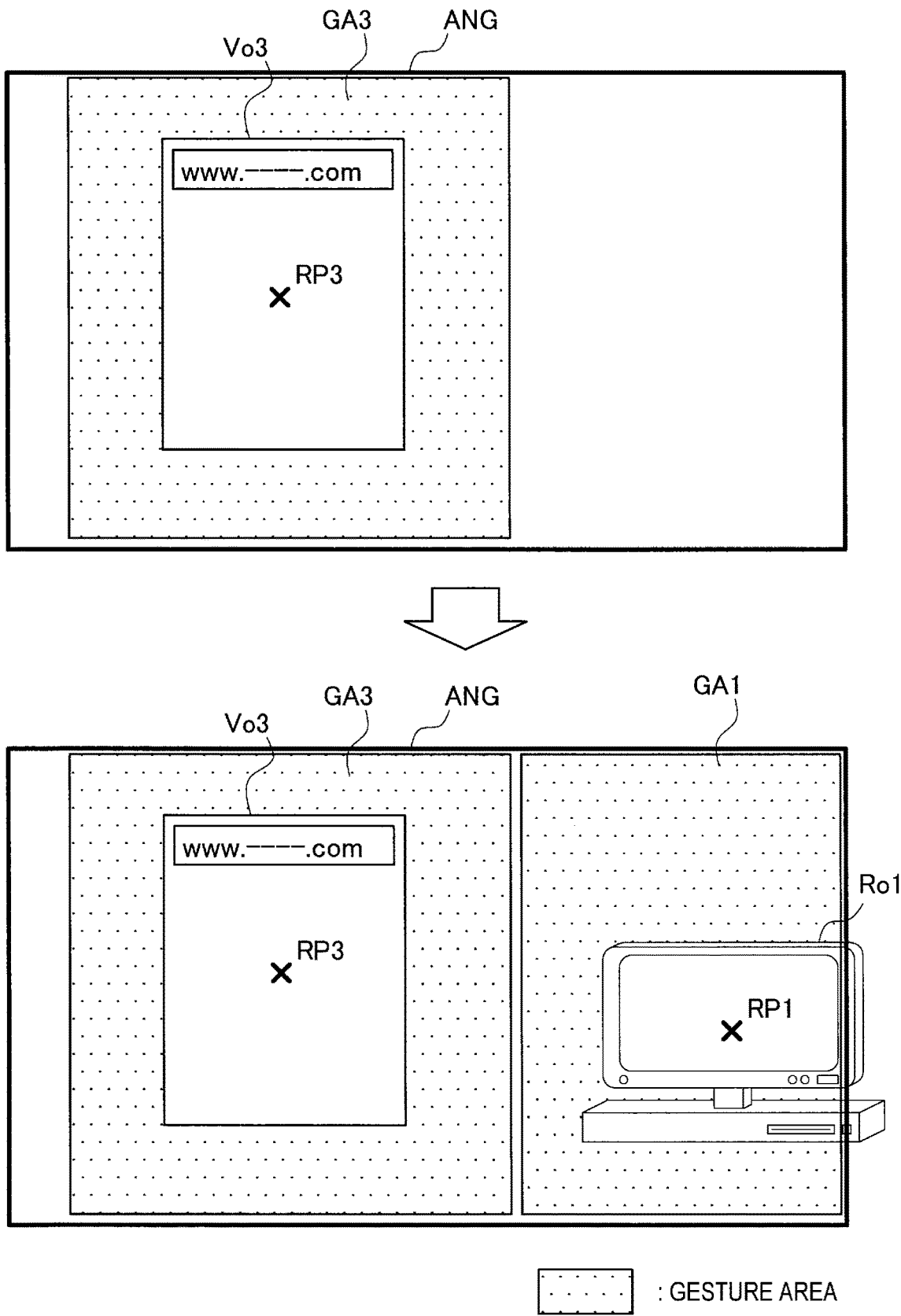

[Fig. 16]
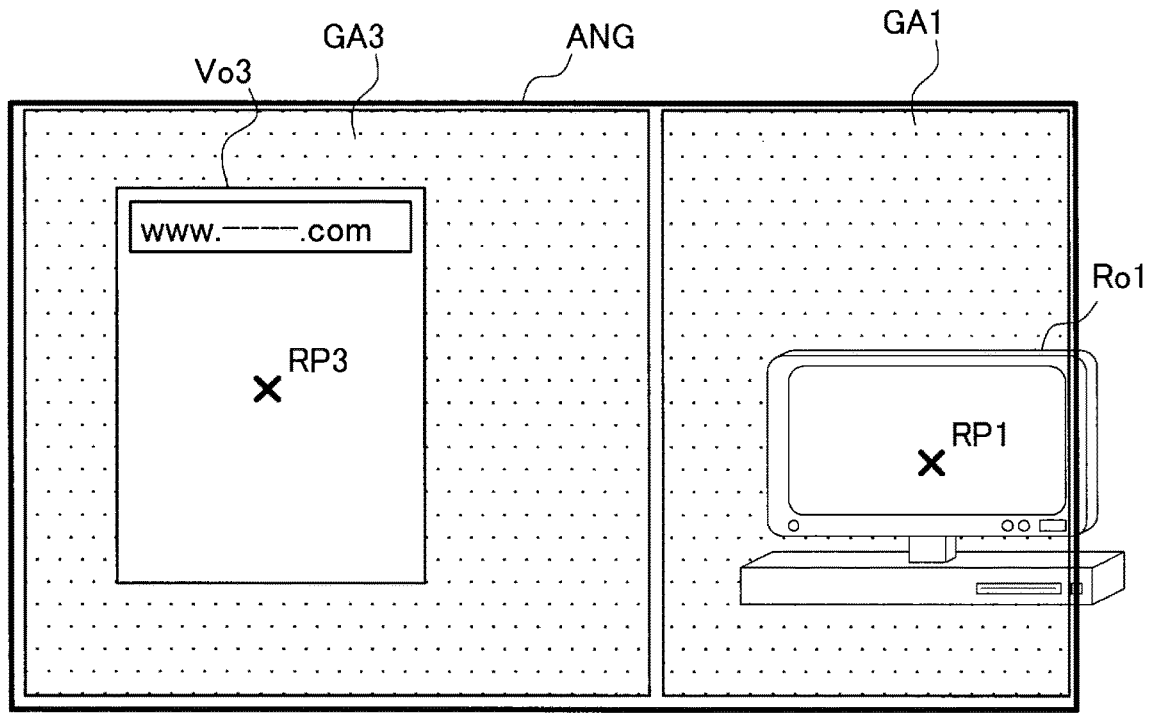
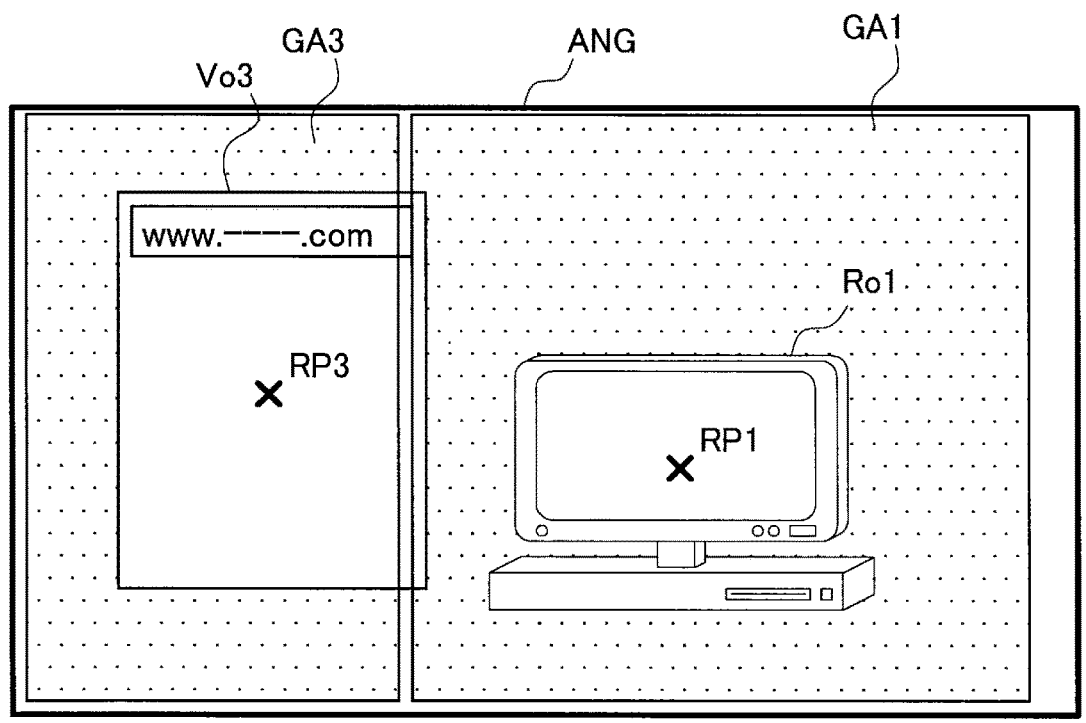

[Fig. 17]
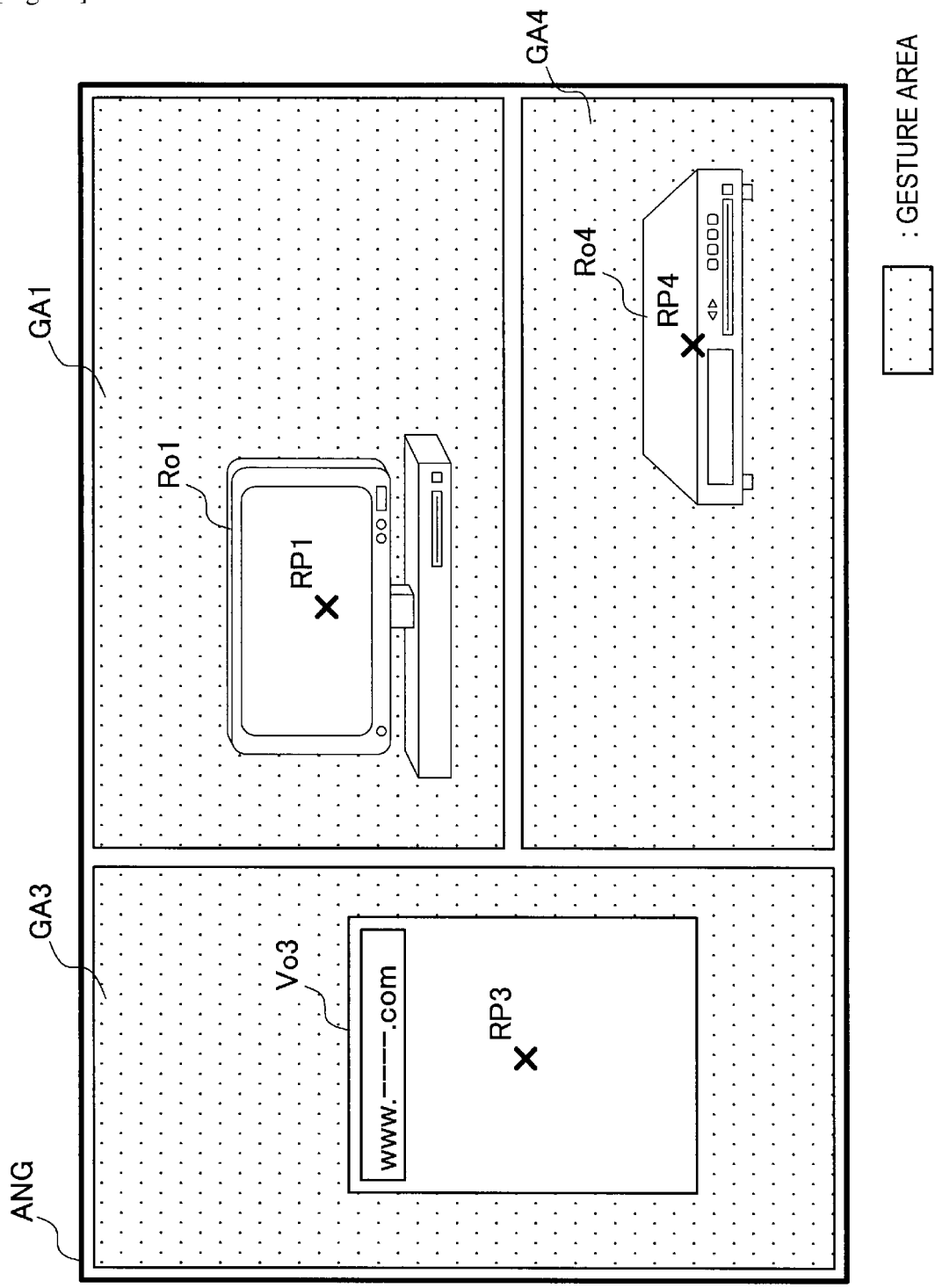

[Fig. 18A]
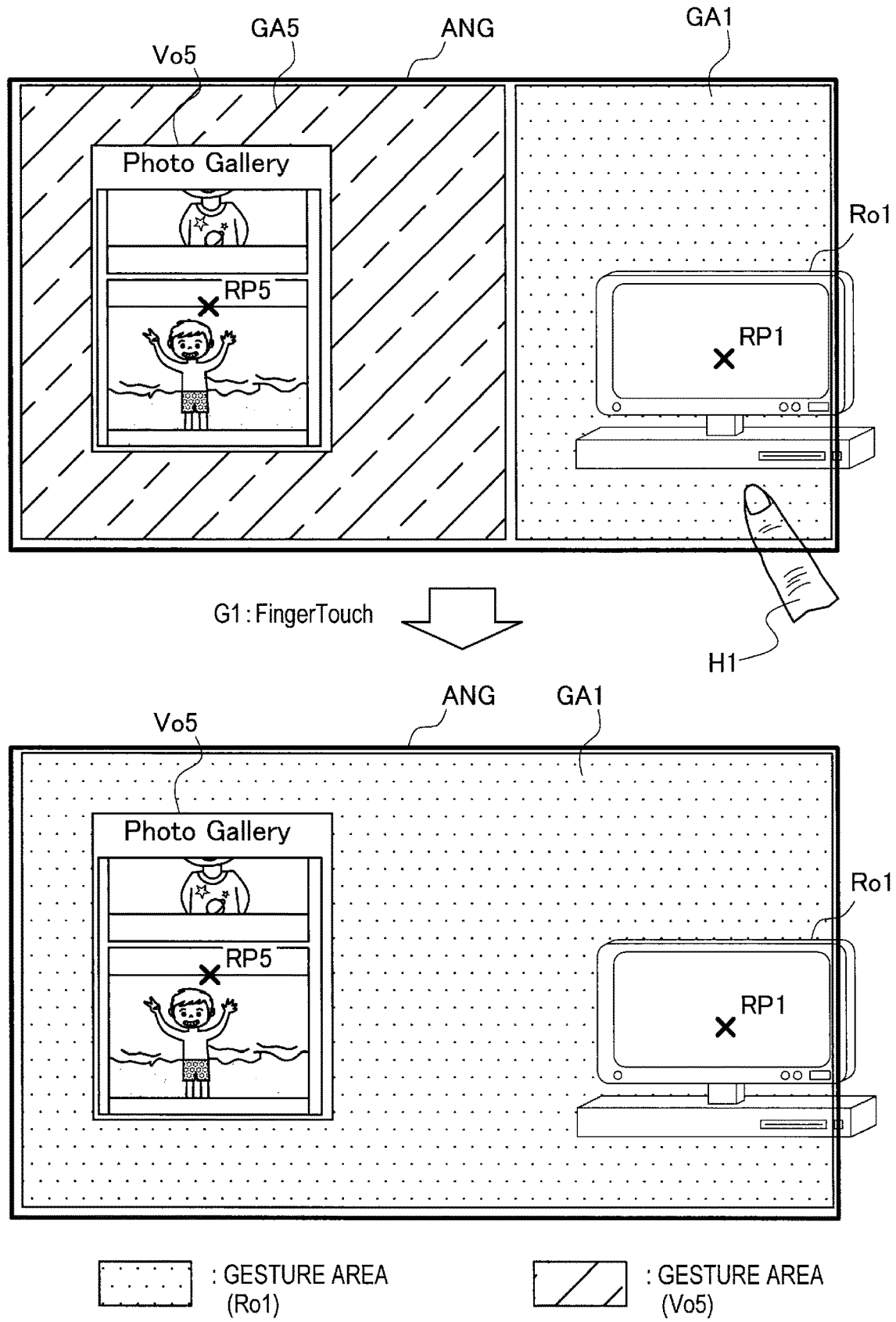

[Fig. 18B]
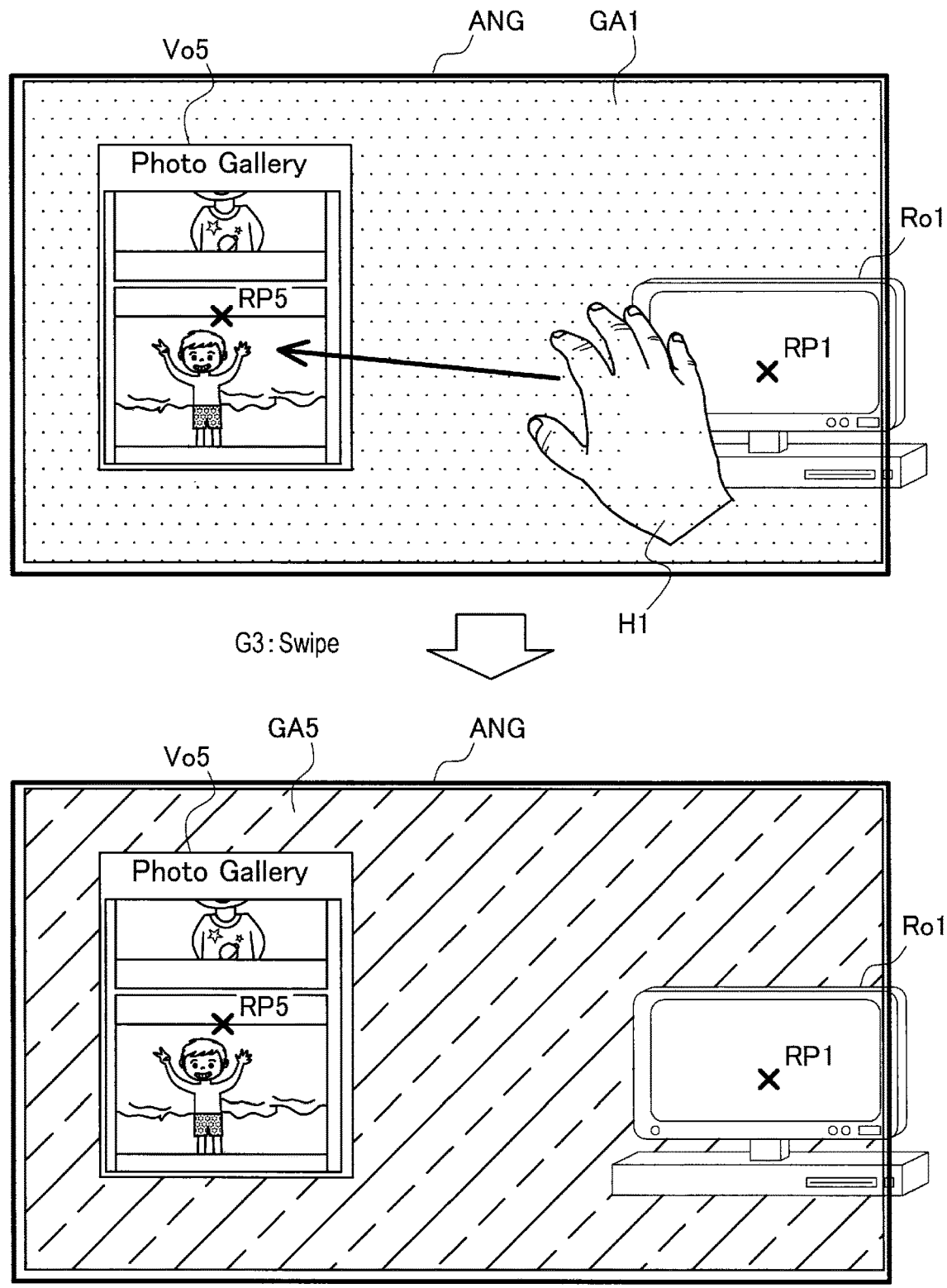

[Fig. 19]
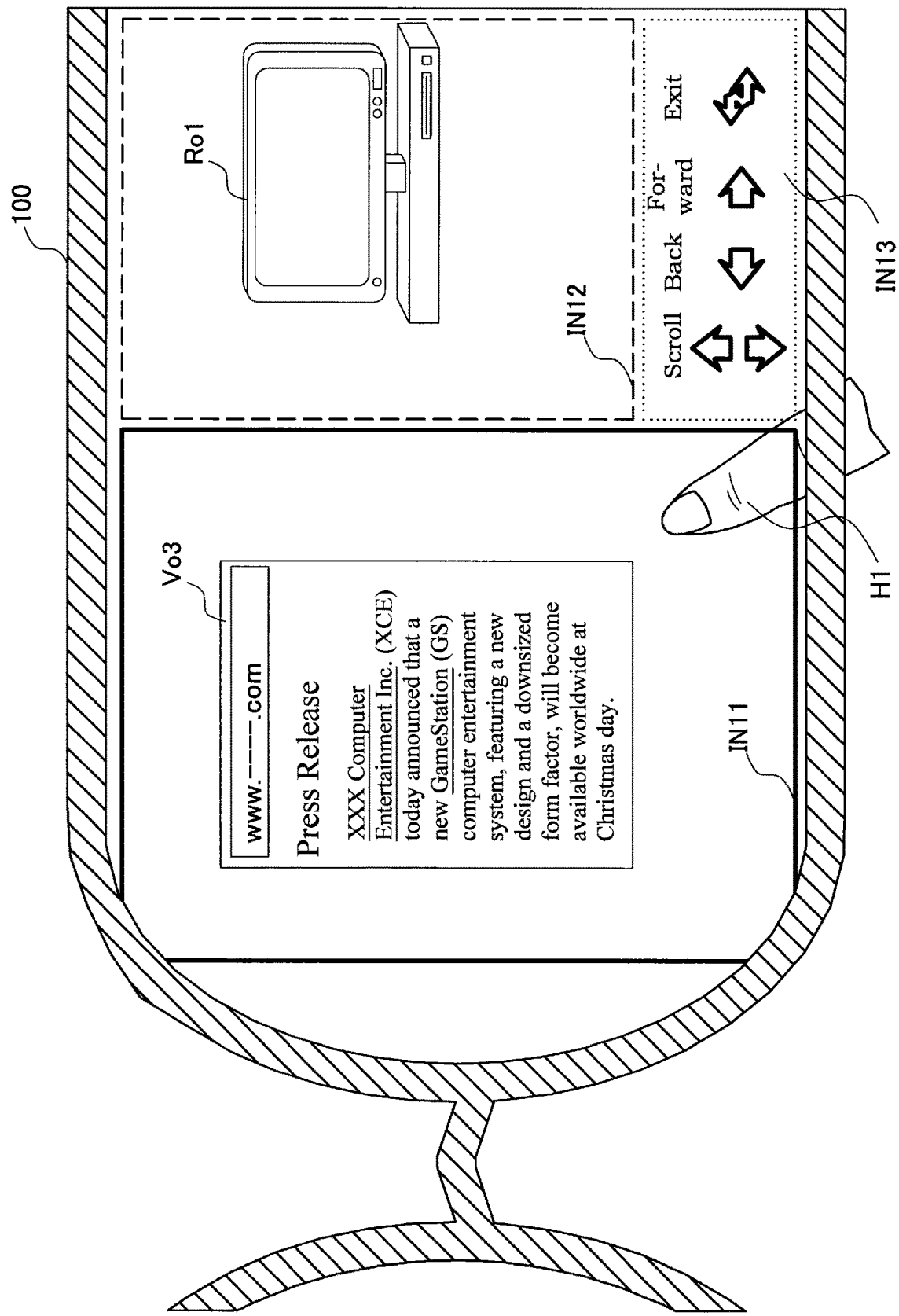

[Fig. 20]
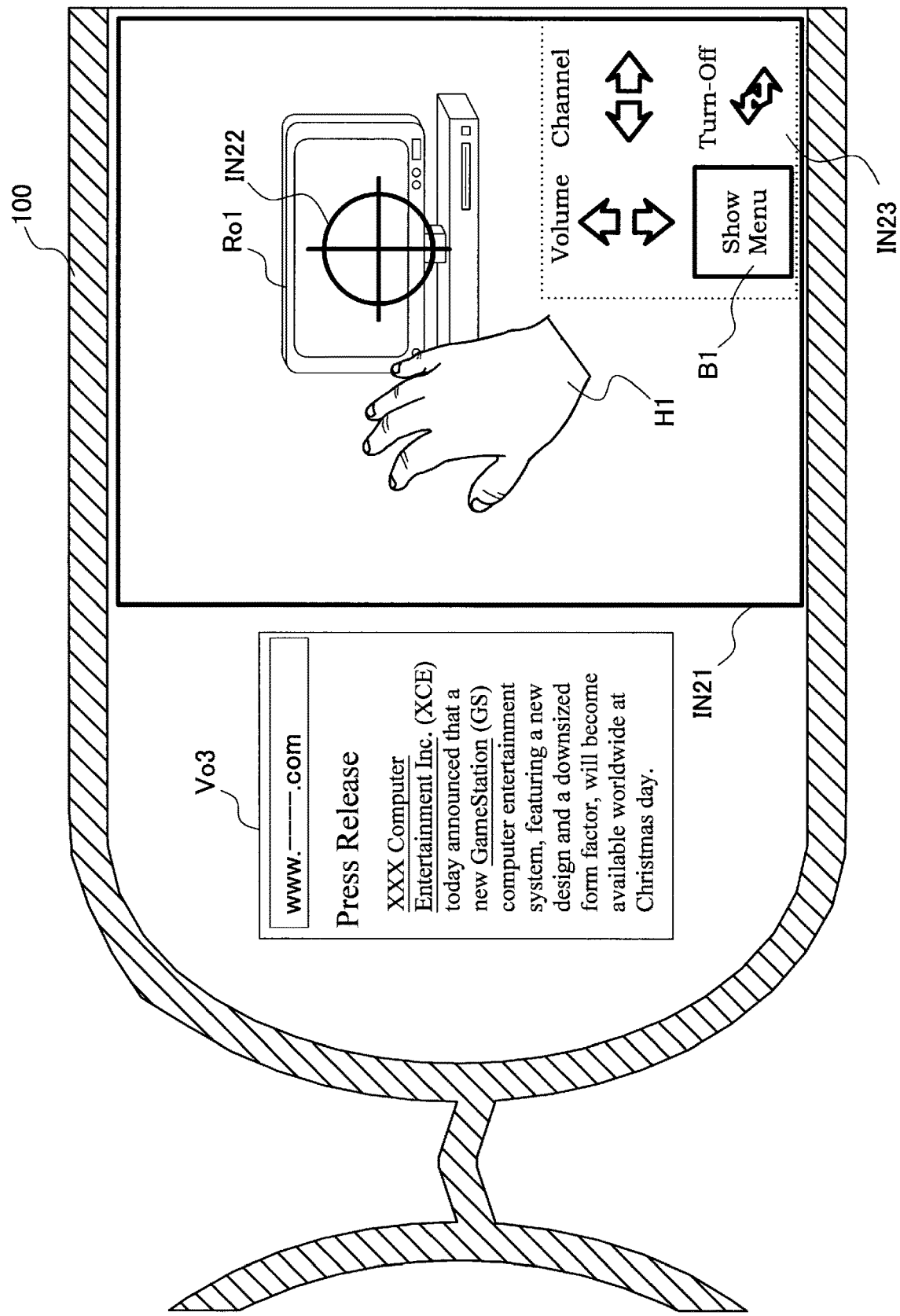

[Fig. 21]
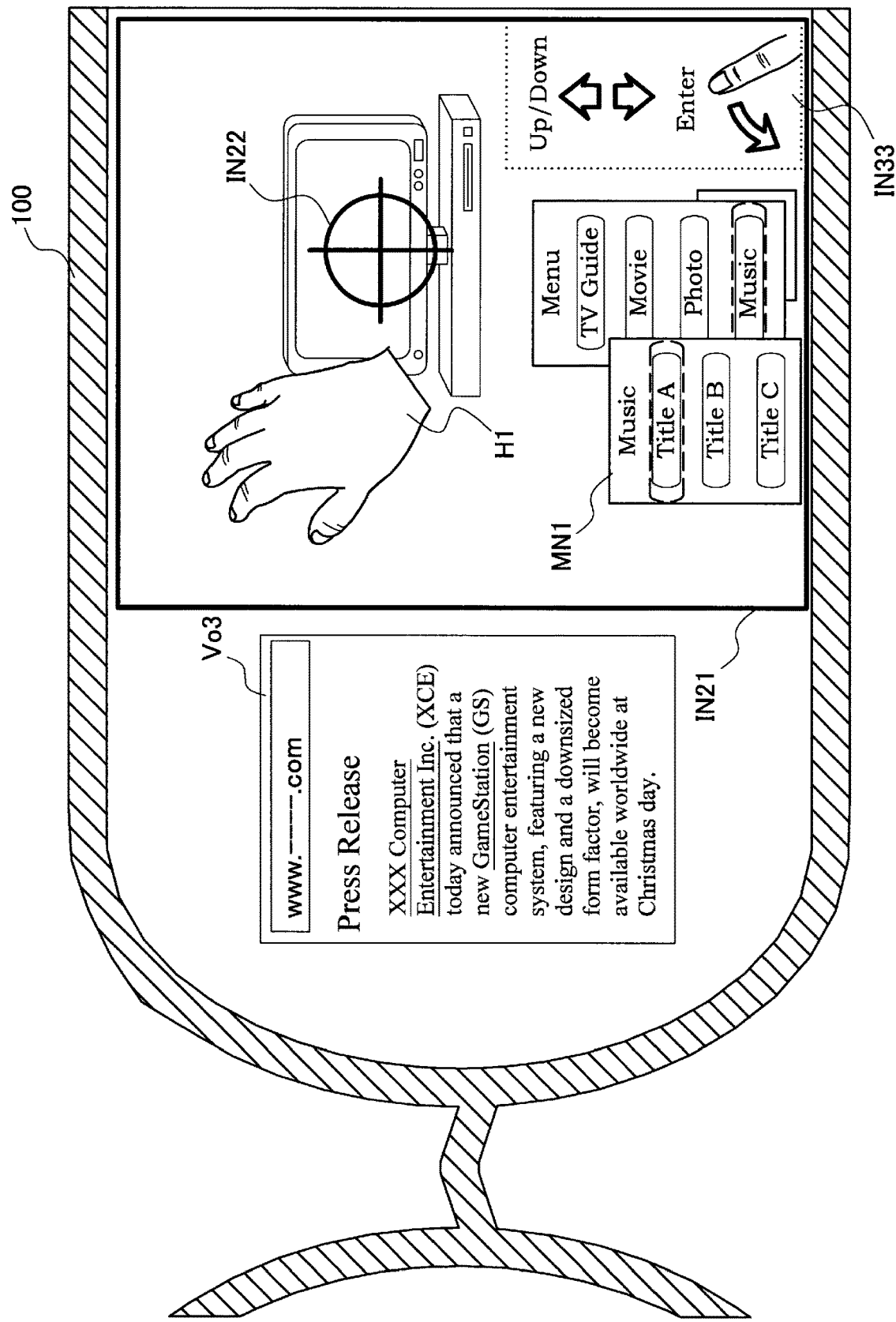

[Fig. 22]
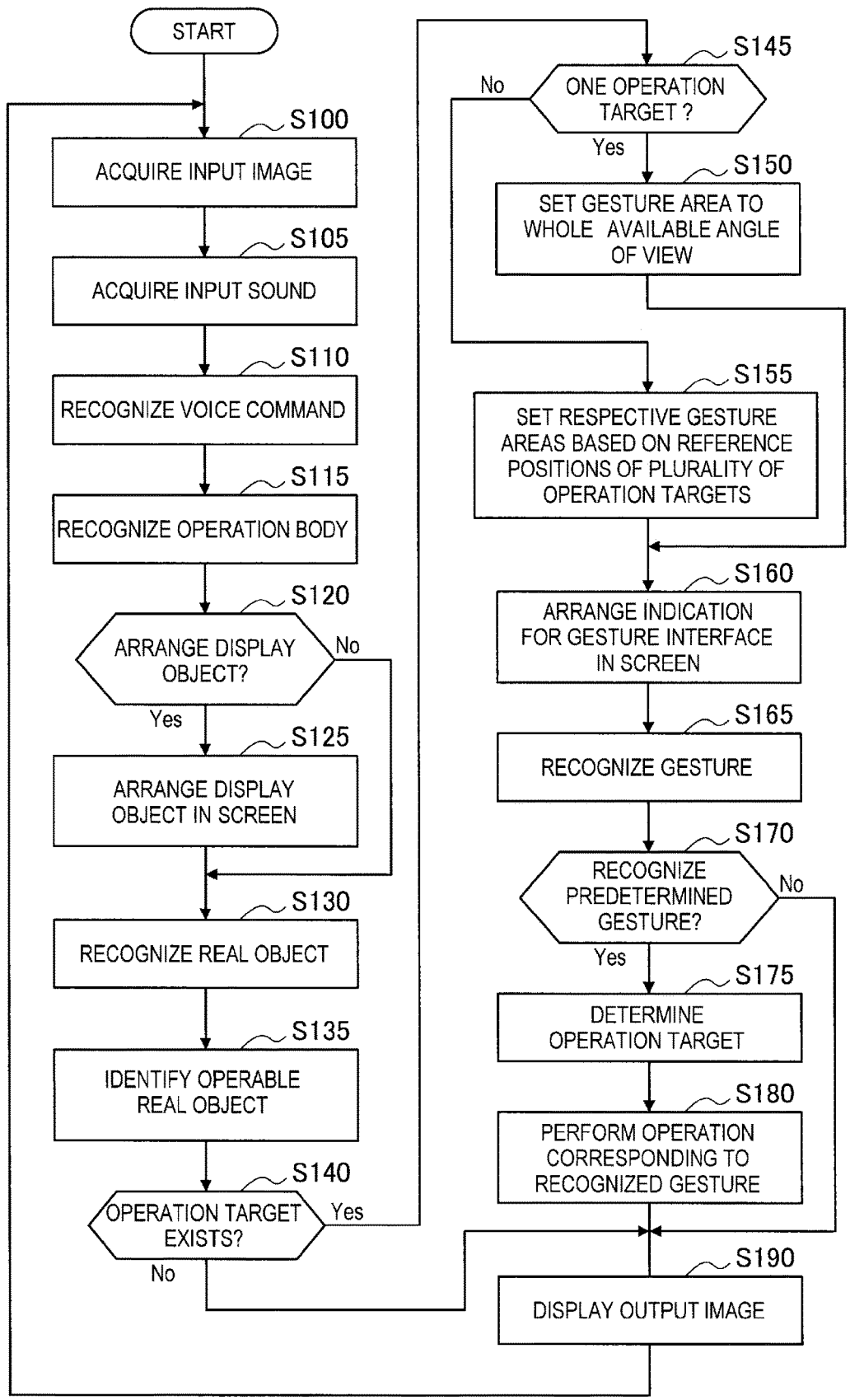

[Fig. 23]
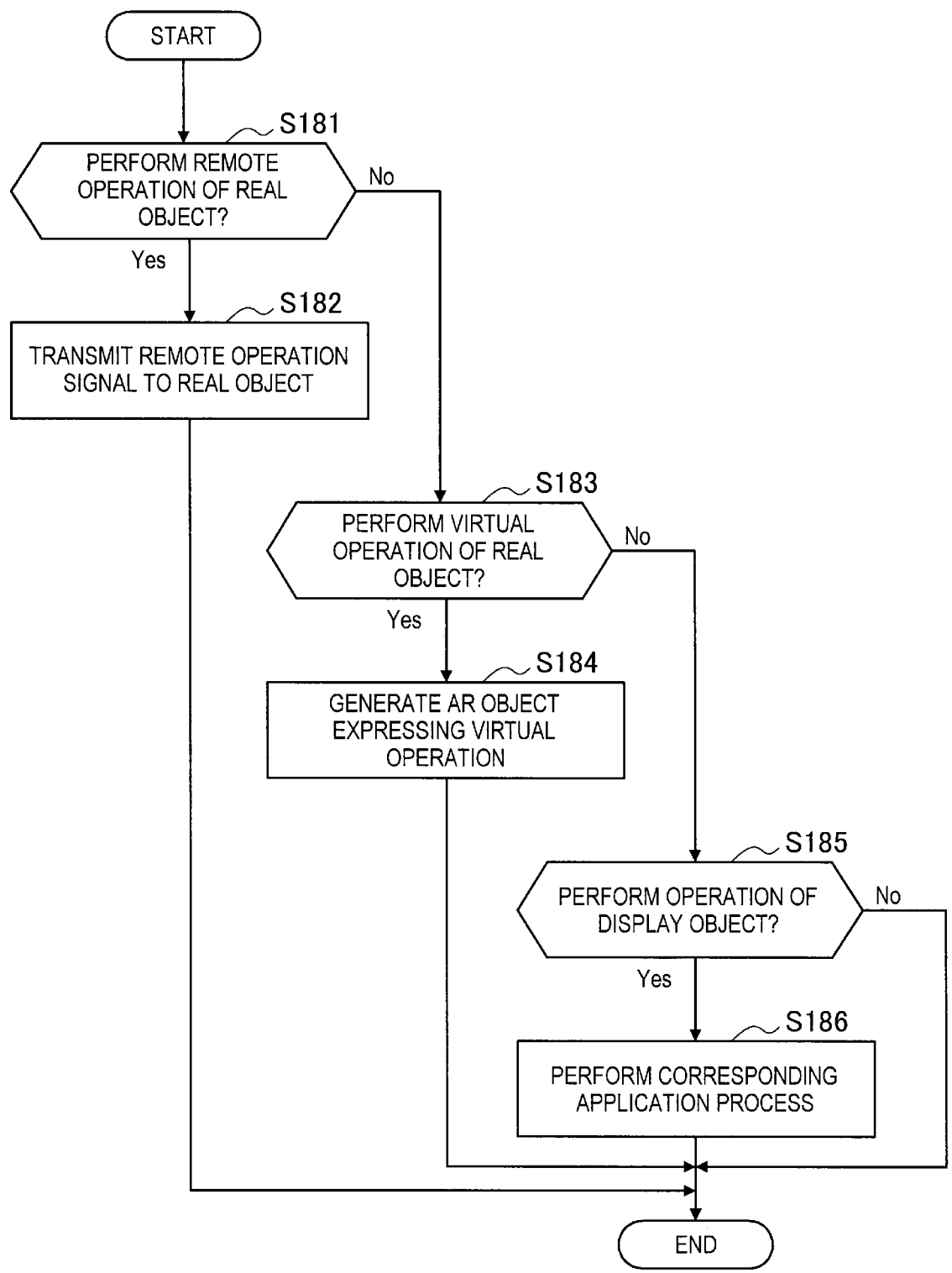

[Fig. 24]
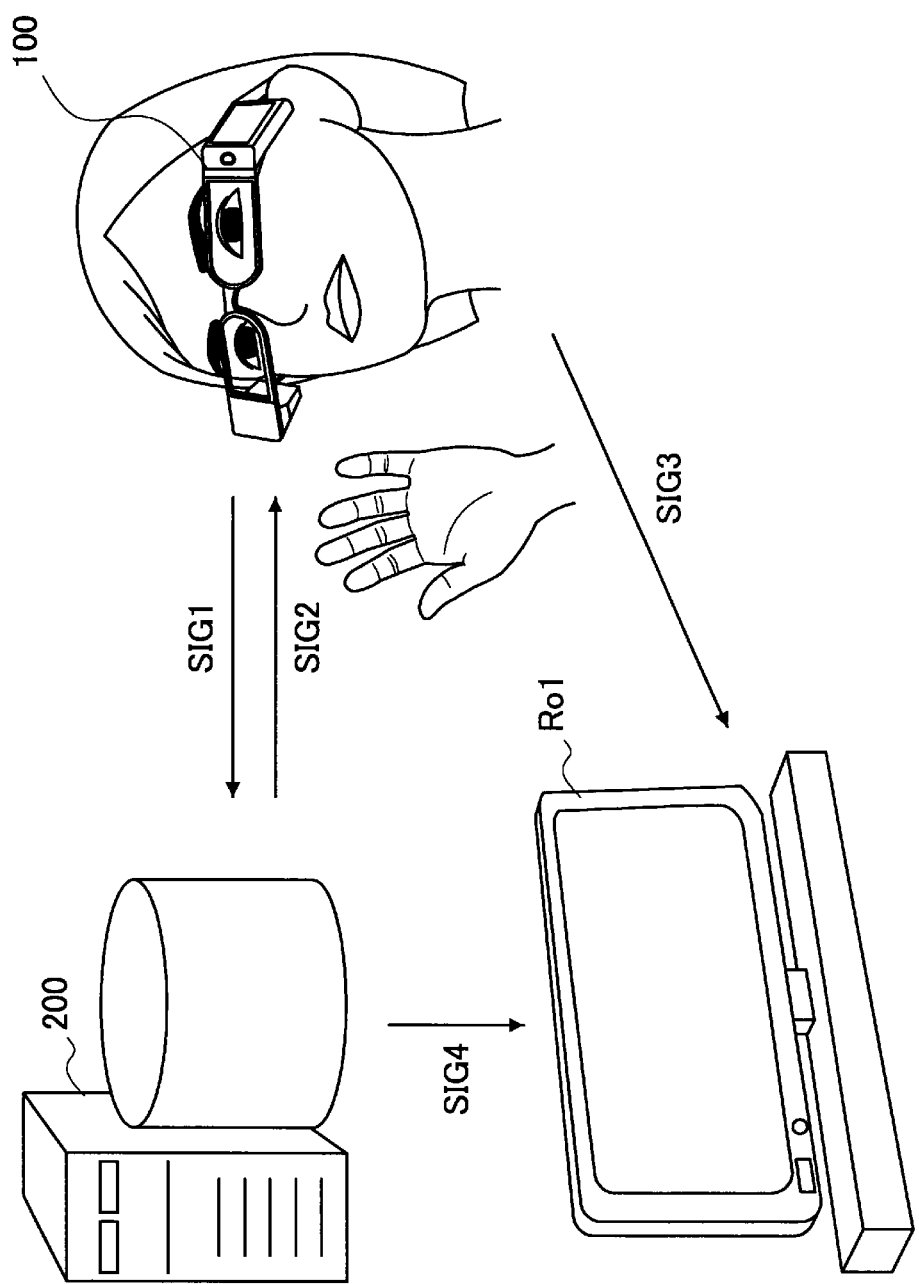

GESTURE RECOGNITION AREAS AND SUB-AREAS FOR INTERACTION WITH REAL AND VIRTUAL OBJECTS WITHIN AUGMENTED REALITY

TECHNICAL FIELD

Cross Reference to Related Applications

This application claims the benefit of Japanese Priority Patent Application JP 2013-058858 filed Mar. 21, 2013, the entire contents of which are incorporated herein by reference.

The present disclosure related to an information processing apparatus, an operation control method and a program.

BACKGROUND ART

In the past, there has been a technology in which a user interface (UI) for operating an apparatus as an operation target is displayed in a screen arranged so as to come into a user's field of vision to enable the apparatus to be operated through the displayed UI. For example, PTL 1 described below discloses that the user, in operating an apparatus made viewed in a head mounted display, gives a user input to the apparatus or a virtual UI associated with the apparatus by a gesture (e.g., a gesture touching the apparatus).

CITATION LIST

Patent Literature

[PTL 1]
JP 2012-181809A

SUMMARY

Technical Problem

However, in the scheme disclosed in PTL 1, a screen area accepting a gesture input is limited to a display area or virtual UI area for the apparatus. This limits a degree of freedom of the gesture input, and accuracy demanded for the gesture (e.g., accurately pointing the apparatus) may be placed as a burden on the user.

Therefore, a system is desirably provided in which an available screen area can be used more freely for the gesture.

Solution to Problem

In a first aspect, an information processing apparatus includes circuitry that is configured to provide a user interface to control a plurality of controllable objects. The user interface is associated with a gesture recognition area that is defined by a predetermined detection area of a sensor. The gesture recognition area is divided into a plurality of gesture recognition sub-areas based on a number of the controllable objects to be controlled by the user interface. The circuitry is further configured to detect a predetermined gesture within the predetermined detection area, determine the gesture recognition sub-area in which the predetermined gesture is detected, and perform an operation on one of the controllable objects based on the detected predetermined gesture and the determined gesture recognition sub-area in which the predetermined gesture is detected.

In another aspect, an information processing system includes circuitry that is configured to provide a user interface to control a plurality of controllable objects. The user interface is associated with a gesture recognition area that is defined by a predetermined detection area of a sensor. The gesture recognition area is divided into a plurality of gesture recognition sub-areas based on a number of the controllable objects to be controlled by the user interface. The circuitry is further configured to detect a predetermined gesture within the predetermined detection area, determine the gesture recognition sub-area in which the predetermined gesture is detected, and perform an operation on one of the controllable objects based on the detected predetermined gesture and the determined gesture recognition sub-area in which the predetermined gesture is detected.

In another aspect, a method of an information processing apparatus for controlling a plurality of controllable objects is provided. The method includes providing, by circuitry of the information processing apparatus, a user interface to control the plurality of controllable objects. The user interface is associated with a gesture recognition area that is defined by a predetermined detection area of a sensor. The gesture recognition area is divided into a plurality of gesture recognition sub-areas based on a number of the controllable objects to be controlled by the user interface. A predetermined gesture is detected within the predetermined detection area. The gesture recognition sub-area in which the predetermined gesture is detected is determined. Further, the circuitry of the information processing apparatus performs an operation on one of the controllable objects based on the detected predetermined gesture and the determined gesture recognition sub-area in which the predetermined gesture is detected.

In a further aspect, a non-transitory computer-readable storage medium storing instructions which, when executed by a computer, cause the computer to perform a method for controlling a plurality of controllable objects is provided. The method includes providing, by the computer, a user interface to control the plurality of controllable objects. The user interface is associated with a gesture recognition area that is defined by a predetermined detection area of a sensor. The gesture recognition area is divided into a plurality of gesture recognition sub-areas based on a number of the controllable objects to be controlled by the user interface. A predetermined gesture within the predetermined detection area is detected. The gesture recognition sub-area in which the predetermined gesture is detected is determined. Further, the computer performs an operation on one of the controllable objects based on the detected predetermined gesture and the determined gesture recognition sub-area in which the predetermined gesture is detected.

Advantageous Effects of Invention

According to one or more of embodiments of the present disclosure, the available screen area can be more freely used for the gesture.

BRIEF DESCRIPTION OF DRAWINGS

FIG. 1 is an illustration diagram for illustrating an overview of an apparatus.

FIG. 2 is an illustration diagram for illustrating an example of an operation target and an existing gesture interface.

FIG. 3 is an illustration diagram for illustrating another example of the operation target.

FIG. 4 is an illustration diagram for illustrating other example of the operation target.

FIG. 5 is a block diagram showing an example of a hardware configuration of an information processing apparatus according to an embodiment.

FIG. 6 is a block diagram showing an example of a logical configuration of an information processing apparatus according to an embodiment.

FIG. 7A is an illustration diagram for illustrating a first example of a recognizable gesture.

FIG. 7B is an illustration diagram for illustrating a second example of a recognizable gesture.

FIG. 7C is an illustration diagram for illustrating a third example of a recognizable gesture.

FIG. 7D is an illustration diagram for illustrating a fourth example of a recognizable gesture.

FIG. 7E is an illustration diagram for illustrating a fifth example of a recognizable gesture.

FIG. 7F is an illustration diagram for illustrating a sixth example of a recognizable gesture.

FIG. 8 is an illustration diagram for illustrating an example of a reference position in a case where an operation target is a real object.

FIG. 9 is an illustration diagram for illustrating another example of the reference position in the case where the operation target is a real object.

FIG. 10 is an illustration diagram for illustrating an example of the reference position in a case where the operation target is a display object.

FIG. 11 is an illustration diagram for illustrating that the reference position of the display object follows a motion of an operation body.

FIG. 12 is an illustration diagram for illustrating an example of a gesture area which may be set in a state where only a single operation target exists.

FIG. 13A is a first illustration diagram for illustrating a first scheme to set the gesture area for a plurality of operation targets.

FIG. 13B is a second illustration diagram for illustrating a first scheme to set the gesture area for a plurality of operation targets.

FIG. 14 is an illustration diagram for illustrating a second scheme to set the gesture area for a plurality of operation targets.

FIG. 15 is a first illustration diagram for illustrating a third scheme to set the gesture area for a plurality of operation targets.

FIG. 16 is a second illustration diagram for illustrating a fourth scheme to set the gesture area for a plurality of operation targets.

FIG. 17 is an illustration diagram for illustrating a further scheme to set the gesture area for the plurality of operation targets.

FIG. 18A is a first illustration diagram for illustrating mergence of a gesture area.

FIG. 18B is a second illustration diagram for illustrating mergence of a gesture area.

FIG. 19 is an illustration diagram for illustrating some examples of an indication for gesture interface.

FIG. 20 is an illustration diagram for illustrating other examples of the indication for gesture interface.

FIG. 21 is an illustration diagram for illustrating an example of the gesture input to a menu.

FIG. 22 is a flowchart showing an example of a general flow of an operation control process according to an embodiment.

FIG. 23 is a flowchart showing an example of a detailed flow of a process at step S180 in FIG. 22.

FIG. 24 is an illustration diagram for illustrating cooperation between a plurality of apparatuses.

DESCRIPTION OF EMBODIMENTS

Hereinafter, an explanation will be given in detail of preferred embodiments of the present disclosure with reference to the drawings. In the description and drawings, components having substantially the same functional configuration are denoted by the same symbol to omit the duplicated explanation.

The explanations are made in the order below.
1. Overview
2. Information processing apparatus according to an embodiment
2-1. Hardware configuration
2-2. Logical configuration
2-3. Example of gesture
2-4. Example of reference position
2-5. Setting example of gesture area
2-6. Mergence of gesture area
2-7. Indication for gesture interface
3. Example of process flow
3-1. General flow
3-2. Performing of operation
4. Cooperation between plurality of apparatuses
5. Conclusion <1. Overview>

The technology of the present disclosure is applicable to various forms of apparatuses. FIG. 1 is an illustration diagram for illustrating an overview of an apparatus to which the technology of the present disclosure is applicable. In an example in FIG. 1, an information processing apparatus 100 is a head mounted display (HMD). The HMD is to be worn by a user on his/her head and has a see-through or non-see-through screen arranged so as to be located in front of one or both of user's eyes. The information processing apparatus 100 also includes a camera 101. The camera 101 is arranged such that an optical axis thereof is approximately parallel with a line of sight of the user, and used for imaging an image to be superimposed on a user's field of vision. A chassis of the information processing apparatus 100 includes a flame supporting the screen and a so-called temple positioned on a temporal part of the user. The temple may have various modules stored therein for information processing and communication. The chassis may have an operation mechanism such as a touch sensor, button, switch, or wheel provided on a surface thereof.

In the example in FIG. 1, the user is positioned in a real space 1. In the real space 1, real objects Ro1 and Ro2 exist. The real object Ro1 is a TV apparatus. The real object Ro2 is a map put on a wall. The user can view the real objects Ro1 and Ro2 on the screen of the information processing apparatus 100. The user can view on the screen display objects which may be displayed by the information processing apparatus 100 other than these real objects.

While the user views the screen of the information processing apparatus 100, a user's hand is not restrained. Therefore, the user can allow the camera 101 to image various gestures by use of his/her hand or other operation bodies (e.g., the real object gripped by the hand, a leg or the like). Accordingly, a gesture interface utilizing such a gesture has been proposed in the existing scheme.

FIG. 2 is an illustration diagram for illustrating an example of an operation target and an existing gesture interface. With reference to FIG. 2, the real object Ro1 is displayed on the screen of the information processing apparatus 100. In addition, a user interface UI1 for operating the real object Ro1 is superimposed on the screen.

The user interface UI1 is a virtual menu and includes menu items UI1a, UI1b, UI1c, UI1d, and UI1e. If the user touches any menu item, for example, using an operation body H1, the real object Ro1 performs a function corresponding to the touched menu (e.g., channel change or sound volume change).

FIG. 3 is an illustration diagram for illustrating another example of the operation target. With reference to FIG. 3, the real object Ro2 is displayed on the screen of the information processing apparatus 100. Here, assume that a virtual operation for the real object Ro2 is defined in advance. The virtual operation may be displaying of an enlarged or reduced map, for example. If the user, for example, pinches out the real object Ro2 using the operation body H1, map data for rendering the enlarged map is dynamically acquired and the enlarged map is displayed on the screen on the basis of the acquired map data.

FIG. 4 is an illustration diagram for illustrating other example of the operation target. With reference to FIG. 4, a display object Vo3 is displayed on the screen of the information processing apparatus 100. The display object Vo3 is an Internet browser having a scroll bar. If the user, for example, scrolls down the scroll bar using the operation body H1, content in the display object Vo3 is also scrolled.

As described above, in the gesture interface, the screen area accepting the gesture input is limited to a specified object area or a virtual UI area. For this reason, the user has to accurately point those areas and thereafter make a predetermined gesture. In a case where the screen area accepting the gesture input is narrow, a degree of freedom of the gesture input is also limited. Therefore, it is hard to say that the existing scheme sufficiently brings out convenience of the gesture interface. Here, an explanation will be given of a system in which an available screen area can be used more freely for the gesture from the next section.

Here, the technology of the present disclosure is not limited to the above described example of the HMD, and applicable to various systems for operating any operation target on the basis of the gesture by the user. For example, the technology of the present disclosure may be applied to an operation assist system which has a screen arranged in front of an operator for assisting the operator operating a vehicle or other machines. In this case, various assist functions are performed via the gesture by the operator. The screen may not be necessarily worn by the user or the operator, and, for example, may be a screen of an information terminal such a smart phone or a portable navigation device.

<2. Information Processing Apparatus According to an Embodiment>
<2-1. Hardware Configuration>

FIG. 5 is a block diagrams showing an example of a hardware configuration of the information processing apparatus 100. With reference to FIG. 5, the information processing apparatus 100 includes a camera 101, microphone 102, input device 103, sensor 104, memory 105, communication interface (I/F) 107, display 108, speaker 109, remote operation I/F 110, bus 111, and processor 112.

(1) Camera

The camera 101 has an imaging device such as a CCD (Charge Coupled Device) or a CMOS (Complementary Metal Oxide Semiconductor) to image an image. Images imaged by the camera 101 (respective frames included in a moving picture) are handled as input images to be processed by the information processing apparatus 100.

(2) Microphone

The microphone 102 collects the sound emitted by the user and generates a sound signal. The sound signal generated by the microphone 102 may be handled as an input sound for sound recognition by the information processing apparatus 100. The microphone 102 may be an omnidirectional microphone and may have fixed or variable directional characteristics.

(3) Input Device

The input device 103 is a device which the user uses in order to directly operate the information processing apparatus 100. The input device 103 may include, for example, the touch sensor, button, switch or wheel provided to the chassis of the information processing apparatus 100. The input device 103 generates, in detecting a user input, an input signal corresponding to the detected user input.

(4) Sensor

The sensor 104 may include a sensor module group such as a measurement sensor measuring a position of the information processing apparatus 100, an acceleration sensor measuring an acceleration applied to on the information processing apparatus 100, a gyro sensor measuring an attitude of the information processing apparatus 100, and the like. The sensor data generated by the sensor 104 may be used for various applications such as to support object recognition, acquire data specific to geographical locations, or detect the user input.

(5) Memory

The memory 105 is configured to include a storage medium (non-transitory medium) such as a semiconductor memory or hard disk and stores a program and data for processing by the information processing apparatus 100. The data stored in the memory 105 may include data in various databases described later. Note that a part or whole of the program and data explained in this description may be acquired from an outside data source (e.g., data server, network storage, external memory or the like) without being stored in the memory 105.

(6) Communication Interface

The communication I/F 107 relays a communication between the information processing apparatus 100 and other apparatuses. The communication I/F 107 supports an arbitrary wireless communication protocol or wire communication protocol and establishes a communication connection with other apparatuses.

(7) Display

The display 108 includes a screen including an LCD (Liquid Crystal Display), OLED (Organic light-Emitting Diode), CRT (Cathode Ray Tube) or the like and a circuit element. The screen of the display 108 is to be located in front of user' eyes so as to come into the user's field of vision, and an angle of view thereof is the same as or partially overlaps an angle of view of the camera 101. The display 108 displays an output image generated by the information processing apparatus 100.

(8) Speaker

The speaker 109 includes a circuit element such as a diaphragm and an amplifier and outputs a sound on the basis of an output sound signal generated by the information processing apparatus 100.

(9) Remote Operation Interface

The remote operation I/F 110 is an interface transmitting a remote operation signal (infrared signal, wireless signal or other control signals) to a remotely operable apparatus. The remote operation I/F 110 modulates the remote operation signal received from the processor 112 described later and transmits the modulated signal.

(10) Bus

The bus 111 connects the camera 101, microphone 102, input device 103, sensor 104, memory 105, communication I/F 107, display 108, speaker 109, remote operation I/F 110 and processor 112 with one another.

(11) Processor

The processor 112 may be, for example, a CPU (Central Processing Unit), DSP (Digital Signal Processor) or the like. The processor 112 executes the program stored in the memory 105 or other storage media to cause various functions of the information processing apparatus 100 described later to be performed.

<2-2. Logical Configuration>

FIG. 6 is a block diagram showing an example of a logical capability configuration achieved by the memory 105 and processor 112 of the information processing apparatus 100 shown in FIG. 5. With reference to FIG. 6, the information processing apparatus 100 includes an image acquisition part 120, sound acquisition part 130, application part 140, recognition part 150, object database (DB) 160, gesture DB 170, and control part 180. The recognition part 150 includes an object recognition part 152, gesture recognition part 154 and sound recognition part 156. The control part 180 includes an operating control part 182 and display control part 184.

(1) Image Acquisition Part

The image acquisition part 120 acquires an image imaged by the camera 101 as the input image. The input image is typically each of a series of frames included in a moving picture. The input image has an angle of view overlapping the user's field of vision. Then, the image acquisition part 120 outputs the acquired input image to the recognition part 150 and the control part 180.

(2) Sound Acquisition Part

The sound acquisition part 130 acquires the sound signal generated by the microphone 102 as the input sound. Then, the sound acquisition part 130 outputs the acquired input sound to the recognition part 150.

(3) Application Part

The application part 140 executes various applications contained in the information processing apparatus 100 to generate the display object. For example, a window may be generated including an Internet browser, content player, mailer, SNS (Social Networking Service) client or the like as the display object. Each application executes an application process under the control by the operating control part 182 described later.

(4) Object Recognition Part

The object recognition part 152 recognizes the real object and the operation body within the input image received from the image acquisition part 120. The object recognition part 152, for example, identifies the real object appearing in the input image by comparing an image characteristic amount extracted from the input image with an image characteristic amount of a known real object stored in the object DB 160 in advance, and recognizes a position of the identified real object within the image. The object recognition part 152, for example, may recognize the three-dimensional position and attitude of the real object by use of a higher object recognition algorithm such as a SfM (Structure from Motion) method, SLAM (Simultaneous Localization And Mapping) method or the like. The object recognition part 152 may similarly recognize the operation body which is the hand and leg of the user or other real objects, for example.

(5) Gesture Recognition Part

The gesture recognition part 154 recognizes a gesture made by the user in order to operate the operation target using the operation body. A gesture recognition process performed by the gesture recognition part 154 may include clipping a partial image in which the operation body is included, scaling the clipped partial image, temporally saving the partial image, calculating a difference between the frames and the like. The gesture recognition part 154 may track an attribute recognized by the object recognition part 152 such as a position, shape, size and the like of operation body, for example and compare temporal changes in those attributes with a known pattern stored in the gesture DB 170 in advance to thereby recognize the gesture expressed by the operation body. Note that in this description the term "gesture" means also a static pose (shape) not accompanied by the temporal change in the attribute of the operation body. An explanation will be given later of some non-limiting examples of the gesture recognizable by the gesture recognition part 154 with reference to the drawings.

(6) Sound Recognition Part

The sound recognition part 156 recognizes a sound emitted by the user on the basis of the input sound received from the sound acquisition part 130. The sound recognition part 156, for example, in a case where the application in execution or the UI accepts input of a voice command, recognizes the voice command from voice of the user to output an identifier of the recognized voice command to the control part 180.

(7) Object DB

The object DB 160 is a database storing object data which is defined in advance with respect to the real object recognized by the object recognition part 152 and the operation body. The object data may include, for example, the identifier, image characteristic amount, remote operation flag and virtual operation flag of each real object. The remote operation flag is flag indicating whether or not the corresponding real object is the remotely operable apparatus. The virtual operation flag is a flag indicating whether or not the virtual operation is defined for the corresponding real object. Further, the object DB 160 may store in advance sound characteristic data for each voice command which the sound recognition part 156 uses for sound recognition.

(8) Gesture DB

The gesture DB 170 is a database storing gesture data which the operating control part 182 uses in order to control the operation of the operation target. The data stored in the gesture DB 170 may include data for a common gesture interface not depending on the operation target and data for a gesture interface inherent to the individual operation target. The gesture data defines, for example, a static pattern or temporal change pattern for any combination of the attributes of the operation body (position, shape, size and the like). The gesture data for the remotely operable real object maps the individual gesture and a remote control signal to be transmitted. The gesture data for the real object having the virtual operation maps the individual gesture and a content of the virtual operation to be displayed. The gesture data for the display object maps the individual gesture and the application process to be executed. The operating control part 174 described later controls, according to the gesture data, the operation of the operation target depending on the recognized gesture.

(9) Operating Control Part

The operating control part 182 sets in the screen the gesture area for recognizing the gesture, and controls the operation of at least one operation target depending on the gesture expressed by the operation body in the set gesture area. In this embodiment, the gesture area may be set larger than a range occupied by the operation target in the input image. Therefore, the user can operate the operation target even if making the gesture at a position apart from the operation target on the screen. In a case where only a single operation target exists, the operating control part 182 may set the gesture area associated with the relevant single set of operation target across a whole of an available area in the screen. The available area may be the whole screen or an area except a part thereof. In addition, in a case where a plurality of operation targets exist, the operating control part 182 sets in the screen the gesture areas respectively associated with the relevant plurality of operation targets on the basis of the reference positions of the relevant plurality of operation targets. An explanation will be further given later of how the available area in the screen can be allocated to the individual operation target with reference to the drawings.

As an example, the operation target controlled by the operating control part 182 may be the remotely operable apparatus. The remotely operable apparatus may include a digital household electrical appliance such as a TV apparatus, video recorder, audio apparatus, and projector, a non-digital household electrical appliance such as a lighting apparatus and air conditioner, and the information terminal such as a PC (Personal Computer) and smart phone, for example. In a case where the gesture by the user is recognized in the gesture area associated with the remotely operable apparatus, the operating control part 182 acquires the remote operation signal corresponding to the recognized gesture from the gesture DB 170 to transmit the acquired remote operation signal to the relevant apparatus.

As another example, the operation target controlled by the operating control part 182 may be the real object for which the virtual operation is defined as explained by use of FIG. 3. The virtual operation is not limited to the example in FIG. 3, and may be any operation. For example, there may be defined an operation such as turning a paper to display the back side thereof, popping up of a character from a poster, or superimposing schedule data on a calendar. In a case where the gesture by the user is recognized in the gesture area associated with such a real object, the operating control part 182 instructs the display control part 184 to display the virtual operation corresponding to the relevant recognized gesture.

In addition, as other example, the operation target controlled by the operating control part 182 may be the display object displayed due to the execution of the application by the application part 140. In a case where the gesture by the user is recognized in the gesture area associated with the display object, the operating control part 182 causes the application part 140 to execute the application process corresponding to the recognized gesture.

The operating control part 182 may further control the operation of the operation target via the user interface using the operation mechanism other than the gesture (e.g., the input device 103 or sensor 104).

(10) Display Control Part

The display control part 184 controls display of the screen by the information processing apparatus 100. The display control part 184 outputs the display object such as a window generated by the application part 140 to the display 108 to display the display object on the screen. Further, the display control part 184 displays some indications supporting the user such that the user can easily use the gesture interface. The indication for gesture interface which may be displayed in this embodiment may include an indication indicating the currently set gesture area and an indication indicating the gesture available for operation, for example. An explanation will be given later of concrete examples of these indications with reference to the drawings. Further, when a predetermined gesture is recognized in the gesture area associated with the real object for which the virtual operation is defined, the display control part 184 displays the virtual operation corresponding to the recognized gesture on the screen. A content of the virtual operation may be defined in the gesture DB 170 in advance.

<2-3. Example of Gesture>

FIG. 7A to FIG. 7F each show an example of the gesture recognizable by the gesture recognition part 154. Here, as an example, the operation body is the hand or finger of the user.

In a first example in FIG. 7A, the gesture recognition part 154 recognizes a gesture G1 from a shape of the hand with fingers other than a forefinger being folded and a motion of inclining the finger. The gesture G1 is a gesture (Finger Touch) expressing a touch by the finger.

In a second example in FIG. 7B, the gesture recognition part 154 recognize a gesture G2 from a shape of a palm being opened and a motion of inclining the palm. The gesture G2 is a gesture (Palm Touch) expressing a touch by the palm.

In a third example in FIG. 7C, the gesture recognition part 154 recognizes gestures G3a to G3d from a motion of moving the hand in parallel. The gestures G3a to G3d are a gesture (Swipe) expressing a so-called swipe. The gestures G3a to G3d may be recognized as gestures different from each other depending on directions of the moving in parallel (e.g., four directions of left, right, up and down). Similar gesture may be expressed by another word such as "flick." The moving in parallel with the palm being closed may be recognized as another gesture expressing the drug.

In a fourth example in FIG. 7D, the gesture recognition part 154 recognizes a gesture G4a or G4b from a motion of changing a distance between the forefinger and a thumb. The gesture G4a is a gesture (Pinch Out) expressing a so-called pinching-out which corresponds to a motion of spreading the distance between the forefinger and the thumb. The gesture G4b is a gesture (Pinch In) expressing a so-called pinching-in which corresponds to a motion of narrowing the distance between the forefinger and the thumb.

In a fifth example in FIG. 7E, the gesture recognition part 154 recognizes a gesture G5 from a motion of folding and returning the hand right and left. The gesture G5 is a gesture (Wave) expressing a handwaving sign.

In sixth example in FIG. 7F, the gesture recognition part 154 recognizes a gesture G6 from a motion of the finger defined in advance. The motion for recognizing the gesture G6 may be any motion.

<2-4. Example of Reference Position>

As described above, in the case where a plurality of operation targets exist, the operating control part 182 sets in the screen the gesture areas respectively associated with the relevant plurality of operation targets on the basis of the reference positions of the relevant plurality of operation targets. The reference position of the real object existing in real space may be typically decided based on a position of the relevant real object within the screen. On the other hand, the reference position of the display object which does not existing in the real space and is displayed in the screen may be specified by the user when the relevant display object is displayed.

(1) Reference Position of Real Object

FIG. 8 is an illustration diagram for illustrating an example of the reference position in a case where the operation target is a real object. With reference to FIG. 8, the real object Ro1 is shown with being made viewed in the input image. The object recognition part 152 recognizes as the result of the object recognition that the real object Ro1 is made viewed in an area RA1 in a two-dimensional coordinate system (U, V) corresponding to the angle of view. In the example in FIG. 8, the operating control part 182 decides the center of the area RA1 as a reference position RP1 of the real object Ro1 on the basis of the result of the object recognition. The reference position RP1 may not be necessarily the center of the area RA1, and may be other position associated with the area RA1 such as any apex of the area RA1.

The reference position of the real object may typically vary in response to variation of the angle of view (or movement of the real object). When the real object moves out of the angle of view, the recognition of the real object is lost and the relevant real object becomes out of the operation target. However, as a modified example, the operating control part 182 may make the reference position of the real object remain in the screen for a certain period of time or until an end time the user explicitly specifies after the real object moves out of the angle of view. In an example in FIG. 9, as a result of the variation of the angle of view (arrow D1 a), the real object Ro1 moves out of the angle of view (arrow D1 b). However, the reference position RP1 of the real object Ro1 is made remained at the position where the real object Ro1 is successfully recognized most recently.

(2) Reference Position of Display Object

FIG. 10 is an illustration diagram for illustrating an example of the reference position in a case where the operation target is a display object. With reference to an upper figure in FIG. 10, an operation body H2 is shown with being made viewed in the input image. The object recognition part 152 recognizes as the result of the object recognition that a position of the operation body H2 in the two-dimensional coordinate system (U, V). Here, assume that the user issues a voice command VC1 for activating the Internet browser. The sound recognition part 156 recognizes the voice command VC1. Then, the operating control part 182 controls the application part 140 to activate the Internet browser in response to the recognitions of the operation body H2 and voice command VC1 to arrange a display object Vo3 as a window of the browser at a reference position RP3. With reference to a lower figure in FIG. 10, the display object Vo3 is shown with being displayed at the reference position RP3. The reference position RP3 may be any position decided based on the position of the operation body H2. A three-dimensional attitude of the display object Vo3 may be decided based on an attitude of the operation body H2. In this way, the scheme of activating the application in accordance with a combination of recognizing the operation body and recognizing the voice command can reduce a risk of error that the application is erroneously activated due to an ordinary conversation of the user.

After the display object is once displayed, the reference position of the display object (display position) may or may not follow the motion of the operation body. In the case where the reference position follows the motion of the operation body, an UI is achieved in which as if the user hold the Internet browser in his/her hand, for example. In an example in FIG. 11, under a condition that the operation body has a specific shape (shaped such that the palm is closed to grasp the display object, for example), the reference position RP3 of the display object Vo3 follows the motion of the operation body (arrow D2). In the case where the reference position does not follow the motion of the operation body, the user can freely make a gesture using both hands with respect to the display object once displayed.

<2-5. Setting Example of Gesture Area>

(1) Only Single Operation Target Existing

As described above, in the case where only a single operation target exists, the operating control part 182 may set the gesture area associated with the relevant single operation target across a whole of an available area in the screen.

FIG. 12 is an illustration diagram for illustrating an example of the gesture area which may be set in a state where only a single operation target exists. With reference to FIG. 12, the real object Ro1 is recognized within the input image. The real object Ro1 is operable by the user. No operation target operable by the user (real object or display object) exists. Therefore, in the example in FIG. 12, the operating control part 182 sets a gesture area GA1 associated with the real object Ro1 across a whole of an angle of view ANG. The user may make the gesture anywhere in the gesture area GA1 in order to operate the real object Ro1.

(2) Plurality of Operation Targets Existing

In the case where a plurality of operation targets operable by the user exist, the operating control part 182 sets in the screen the gesture areas respectively associated with the plurality of operation targets on the basis of the reference positions of the plurality of operation targets within the screen. In other words, if two or more operation targets exist, the gesture area for a first operation target may be influenced by the reference positions of other operation targets. Then, the gesture area is allocated to the individual operation target on the basis of the reference positions of two or more operation targets. An explanation will be given below of some schemes for setting respectively the gesture areas to a plurality of operation targets.

FIG. 13A is a first illustration diagram for illustrating a first scheme to set the gesture area for a plurality of operation targets. Here, two operation targets exist. In the first scheme, the operating control part 182 sets in the screen a first gesture area associated with a first operation target having a first reference position and a second gesture area associated with a second operation target having a second reference position by partitioning the angle of view along a boundary passing between the first reference position and the second reference position. With reference to FIG. 13A, the real object Ro1 is recognized within the input image. In addition, the display object Vo3 is displayed. Both the real object Ro1 and the display object Vo3 are operable by the user. The operating control part 182 partitions an angle of view ANG into two areas along a vertical boundary BD1 passing between a reference position RP1 of the real object Ro1 and a reference position RP3 of the display object Vo3. The reference position RP1 is located on the right side of the boundary BD1 and therefore, the area on the right side of the boundary BD1 after the partition is the gesture area GA1 for the real object Ro1. For example, in the gesture area GA1, the user can make a predetermined gesture using the operation body to instruct operations such as the channel change and sound volume change of the TV apparatus as the real object Ro1. On the other hand, the reference position RP3 is located on the left side of the boundary BD1 and therefore, the area on the left side of the boundary BD1 after the partition is a gesture area GA3 for the display object Vo3. For example, in gesture area GA3, the user can make a predetermined gesture using the operation body to instruct operations such as scroll and page change in the window of the Internet browser as the display object Vo3.

The operating control part 182 may decide a direction of the boundary for partitioning the angle of view depending on a positional relationship between the reference positions. This can allow the flexible area allocation from which it is easy for the user to instinctively understand a correspondence between the operation target and the gesture area. For, example, a boundary used for partitioning the angle of view may be a vertical boundary in a case where a vertical distance is shorter than a horizontal distance between two reference positions, or a horizontal boundary in a case where the vertical distance is longer than the horizontal distance between two reference positions. FIG. 13A shows an example of the former and FIG. 13B shows an example of the latter. With reference to FIG. 13B, the real objects Ro1 and Ro2 are recognized within the input image. Both the real objects Ro1 and Ro2 are operable by the user. The operating control part 182 partitions the angle of view ANG into two areas along a horizontal boundary BD2 passing between the reference position RP1 of the real object Ro1 and the reference position RP2 of the real object Ro2. The reference position RP1 is located on the lower side of the boundary BD2 and therefore, the area on the lower side of the boundary BD2 after the partition is the gesture area GA1 for the real object Ro1. On the other hand, the reference position RP2 is located on the upper side of the boundary BD2 and therefore, the area on the upper side of the boundary BD2 after the partition is the gesture area GA2 for the real object Ro2. For example, in the gesture area GA2, the user can make a predetermined gesture using the operation body to call the virtual operation defined for the real object Ro2.

FIG. 14 is an illustration diagram for illustrating a second scheme to set the gesture area for a plurality of operation targets. Here, two operation targets also exist. In the second scheme, the operating control part 182 sets in the screen the first gesture area associated with the first operation target having the first reference position and the second gesture area associated with the second operation target having the second reference position by evenly partitioning the angle of view and allocating the areas after the partition to the first operation target and the second operation target depending on the positional relationship between the first reference position and the second reference position. With reference to FIG. 14, the real object Ro1 is recognized within the input image. In addition, the display object Vo3 is displayed. Both the real object Ro1 and the display object Vo3 are operable by the user. The operating control part 182 partitions the angle of view ANG into two areas along a vertical boundary BD3 passing through the center of the angle of view. The reference position RP1 is located to the right of the reference position RP3 and therefore, the area on the right side of the boundary BD3 after the partition is the gesture area GA1 of the real object Ro1, and the area on the left side of the boundary BD3 after the partition is the gesture area GA3 of the display object Vo3. The scheme like this can prevent each gesture area from being excessively narrowed and allocate the gesture area to a plurality of operation targets in a manner that the user easily understands.

FIG. 15 is an illustration diagram for illustrating a third scheme to set the gesture area for a plurality of operation targets. Here, two operation targets also exist. In the third scheme, the operating control part 182 sets the first gesture area associated with the first operation target having the first reference position, and thereafter, sets the second gesture area associated with the second operation target having the second reference position on the basis of the first reference position and the second reference position. With reference to the upper figure in FIG. 15, the display object Vo3 is displayed. The gesture area GA3 for the display object Vo3 is set in the screen on the basis of the reference position RP3 of the display object Vo3. After that, with reference to the lower figure in FIG. 15, as a result of moving the angle of view, the real object Ro1 is recognized within the input image. The reference position RP1 of the real object Ro1 is located to the right of the gesture area GA3 which has been already set. The gesture area GA1 for the real object Ro1 is influenced by the gesture area GA3 previously set and set to a space area to the right of the gesture area GA3. The scheme like this can allow the user to make an intended gesture even if a new operation target is recognized when the user is going to make the gesture in the gesture area previously set, without being inhibited by occurrence of the new operation target.

FIG. 16 is an illustration diagram for illustrating a fourth scheme to set the gesture area for a plurality of operation targets. Here, two operation targets also exist. In the fourth scheme, the operating control part 182, after setting the first gesture area for the first operation target having the first reference position, changes the first gesture area on the basis of the first reference position and the second reference position of the second operation target which has higher priority. With reference to the upper figure in FIG. 16, the display object Vo3 is displayed. In addition, the real object Ro1 is recognized within the input image. The display object Vo3 has the gesture area GA3, and the real object Ro1 has the gesture area GAF Here, the priority on the real object Ro1 is higher than that on the display object Vo3. After that, with reference to the lower figure in FIG. 16, as a result of moving the angle of view, the reference position RP1 of the real object Ro1 moves leftward within the input image. As a result thereof, the gesture area GA1 for the real object Ro1 extends leftward, while the gesture area GA3 for the display object Vo3 is influence by the gesture area GA1 to be reduced. The scheme like this can make sure to set the sufficient large gesture area with respect to the operation target the user wishes to operate on a priority basis. The priority may be set for a variety of operation targets in any manner.

This section mainly explains the case where two operation targets exist, but the number of the operation targets is not limited to such examples. For example, with reference to FIG. 17, the real objects Ro1 and Ro4 are recognized within the input image. The real object Ro4 is a remotely operable audio apparatus. In addition, the display object Vo3 is displayed. The real objects Ro1 and Ro4, and the display object Vo3 are operable by the user. Here, the operating control part 182 partitions the angle of view ANG into three areas according to any combination of the above described four schemes. In the example in FIG. 17, there are respectively set the gesture area GA1 on the upper right after the partition for the real object Ro1, a gesture area GA4 on the lower right after the partition for a real object Ro4, and the gesture area GA3 on the left side after the partition for the display object Vo3.

In an embodiment, as explained using FIG. 9, as a result of moving the angle of view, after the real object moves out of the angle of view, the reference position of the real object is remained within the angle of view. In this case, the operating control part 182 may set the gesture area for operating the real object which has moved out of the angle of view on the basis of the reference position of the relevant real object remained within the angle of view and the reference positions of other operation targets. Accordingly, the operation via the gesture can be prevented from being unexpectedly broken due to the variation of the angle of view or instability of the object recognition.

<2-6. Mergence of Gesture Area>

Even in a case where a plurality of operation targets exist, the user may possibly wish to make the gesture using a large screen area for operating a certain operation target. In order to satisfy such a demand, there may be provided an UI for merging the gesture area in accordance with an instruction from the user. For example, in a case where the user specifies one of the first operation target and the second operation target, the operating control part 182 merges the gesture area for the other not specified operation target into the gesture area for the specified operation target.

FIG. 18A and FIG. 18B each are an illustration diagram for illustrating mergence of the gesture area. With reference to the upper figure in FIG. 18A, the real object Ro1 is recognized within the input image. In addition, the display object Vo5 is displayed. The display object Vo5 is a window of the content player. Both the real object Ro1 and the display object Vo5 are operable by the user. The operating control part 182 sets the gesture area GA1 for the real object Ro1 and the gesture area GA5 for the display object Vo5 on the basis of the reference position RP1 of the real object Ro1 and the reference position RP5 of the display object Vo5. Here, as an example, assume that the gesture G1 is defined in the gesture DB 170 as a gesture for merging the gesture area. For example, the user makes the gesture G1 using the operation body H1 in the gesture area GA1. The gesture recognition part 154 recognizes the gesture G1 on the basis of the result of recognizing the operation body. Then, as shown in the lower figure in FIG. 18A, the operating control part 182 merges the gesture area GA5 set for the display object Vo5 into the gesture area GA1 for the real object Ro1 specified by the user. As a result thereof, the whole available area within the angle of view ANG becomes the gesture area GA1.

Further, as an example, assume that a gesture G3 is defined as a gesture for switching the operation target in the gesture DB 170. As shown in the upper figure in FIG. 18B, the user makes the gesture G3 using the operation body H1 in gesture area GA1, for example. The gesture recognition part 154 recognizes the gesture G3 on the basis of the result of recognizing the operation body. Then, as shown in the lower figure in FIG. 18B, the operating control part 182 switches the gesture area GA1 for the real object Ro1 to the gesture area GAS for the display object Vo5.

The use of the above described gesture interface makes it possible for the user to freely make various gestures in the maximum large gesture area to operate the intended operation target.

<2-7. Indication for Gesture Interface>

FIG. 19 is an illustration diagram for illustrating some examples of the indication for gesture interface. With reference to FIG. 19, the display object Vo3 is displayed on the screen of the information processing apparatus 100. In addition, the real object Ro1 is recognized. An indication IN11 and an indication IN12 which are superimposed on the output image by the display control part 184 are rectangle frames indicating to the user the gesture area for the display object Vo3 and the gesture area for the real object Ro1, respectively. In the example in FIG. 19, the operation body H1 is positioned on the gesture area for the display object Vo3, a frame border of the indication IN11 is displayed in an intensified manner as compared with the frame border of the indication IN12 (e.g., different color, different thickness of border, or blinking). An indication IN13 indicates a guidance notifying the user of the gesture available for operating the display object Vo3. For example, there can be seen from the indication IN13 that an up and down swipe gesture, leftward swipe gesture, and handwaving gesture respectively correspond to scrolling the window, returning (to previous page), and quitting the application of the application processes. In a case where the operation body H1 moves to the gesture area for the real object Ro1, the display control part 184 may switch the content of the guidance in the indication IN13 to the content for the real object Ro1.

FIG. 20 is an illustration diagram for illustrating other examples of the indication for gesture interface. With reference to FIG. 20, the real object Ro1 is recognized. An indication IN21 superimposed on the output image by the display control part 184 is a rectangle frame indicating to the user the gesture area for the real object Ro1. An indication IN22 is a mark indicating to the user that the real object Ro1 is the operation target as a result of the operation body H1 being positioned on the gesture area for real object Ro1. An indication IN23 indicates a guidance notifying the user of the gesture available for operating the real object Ro1. For example, there can be seen from the indication IN23 that a up and down swipe gesture, right and left swipe gesture, and handwaving gesture respectively correspond to changing the sound volume, changing the channel, and turning off the power of the remote operations. Further, the indication IN23 includes a button B1 displaying a detail menu.

For example, in a case where the user touches the button B1 in FIG. 20, the display control part 184 may acquire an operation menu for real object Ro1 to superimpose a menu MN1 illustrated in FIG. 21 on the output image. The menu MN1 includes a plurality of menu items hierarchically structured, for example. An indication IN33 indicates a guidance notifying the user of the gesture available for operating the menu MN1 of the real object Ro1. For example, there can be seen from the indication IN33 that an up and down swipe gesture, and touch gesture respectively correspond to moving a focus of the menu item, and deciding the menu item of the operations. The user may not directly touch a narrow display area of the menu MN1*f* or respective menu items to operate the menu MN1. The user can make the gesture in the large gesture area set for the real object Ro1 to operate the menu MN1.

<3. Example of Process Flow>

<3-1. General Flow>

FIG. 22 is a flowchart showing an example of a general flow of an operation control process performed by the information processing apparatus 100. The operation control process described herein is repeated for each of a series of frames included in a moving picture acquired by the image acquisition part 120.

With reference to FIG. 22, first, the image acquisition part 120 acquires an image imaged by the camera 101 as the input image (step S100). Then, the image acquisition part 120 outputs the acquired input image to the recognition part 150 and the control part 180.

The sound acquisition part 130 acquires the sound signal generated by the microphone 102 as the input sound (step S105). Then, the sound acquisition part 130 outputs the acquired input sound to the recognition part 150.

Next, the sound recognition part 156 recognizes the voice command issued by the user on the basis of the input sound received from the sound acquisition part 130 (step S110). If any voice command is recognized, the sound recognition part 156 outputs the identifier of the recognized voice command to the control part 180.

The object recognition part 152 recognizes the operation body made viewed in the input image which is received from the image acquisition part 120 (step S115). Then, the object recognition part 152 outputs the position of the recognized operation body within the screen to the control part 180.

Next, the operating control part 182 determines whether or not the display object is to be arranged on the basis of the result of recognizing the voice command received from the sound recognition part 156 and the result of recognizing the operation body received from the object recognition part 152 (step S120). Then, if the display object is determined to be arranged, the operating control part 182 controls the application part 140 to generate the display object corresponding to the recognized voice command and arranges the display object at the reference position decided from the position of the operation body (step S125).

The object recognition part 152 recognizes the real object made viewed in the input image which is received from the image acquisition part 120 (step S130). Then, the object recognition part 152 outputs the position of the recognized real object within the screen to the control part 180.

Next, the operating control part 182 identifies the operation target operable by the user from the display object arranged in the screen and the recognized real object by referring to the object DB 160 (step S135). The process thereafter is branched depending on the number of operation targets operable by the user (steps S140, S145). If there exists no operation target operable by the user, the process proceeds to step S190. If there exists only one operation target operable, the process proceeds to step S150. If there exist a plurality of operation targets operable, the process proceeds to step S155.

If there exists only one operation target operable, the operating control part 182 sets the gesture area associated with that one operation target to the whole available angle of view (step S150).

On the other hand, if there exist a plurality of operation targets available, the operating control part 182 sets in the screen the gesture areas respectively associated with the plurality of operation targets on the basis of the reference positions of the relevant plurality of operation targets (step S155). The setting of the gesture area here may be carried out according to any scheme of various schemes explained using FIG. 13A to FIG. 18B.

Next, the display control part 184 arranges the indication for supporting the user using the gesture interface on the screen (step S160). The indication for gesture interface arranged here may include any indication as illustrated in FIG. 19 to FIG. 21.

Further, the gesture recognition part 154 recognizes the gesture made using the operation body on the basis of the result of recognizing the operation body in the gesture area set by the operating control part 182 (step S165). Then, the gesture recognition part 154 outputs the identifier of the recognized gesture to the operating control part 182.

If a predetermined gesture is recognized by the gesture recognition part 154 (step S170), the operating control part 182 determines which operation target to operate on the basis of in which gesture area the gesture is made (step S175). Then, the operating control part 182 controls the determined operation target to perform the operation corresponding to the recognized gesture (step S180).

The display control part 184 displays the output image which may include a feedback about the performed operation on the screen of the display 108 (step S190). The process thereafter returns to step S100.

<3-2. Performing of Operation>

FIG. 23 is a flowchart showing an example of a detailed flow of the process at step S180 in FIG. 22. The process in FIG. 23 is branched based on a type of the operation target.

For example, if the operation target is the real object remotely operable (step S181), the operating control part 182 transmits the remote operation signal corresponding to the recognized gesture from the remote operation I/F 110 to the relevant real object (step S182).

If the operation target is the real object for which the virtual operation is defined (step S183), the operating control part 182 control the display control part 184 to generate an augmented reality (AR) object expressing the virtual operation corresponding to the recognized gesture (step S184). The AR object generated here may be displayed on the screen at step S190 in FIG. 22.

If the operation target is the display object such as an application window (step S185), the operating control part 182 controls the application part 140 to execute the application process corresponding to the recognized gesture (step S186). A result of executing the application process may be displayed on the screen at step S190 in FIG. 22.

Here, the process flow explained in this section is merely one example. In other words, some of the above described process steps may be omitted, and other process steps may be added, or the order of the process steps may be altered. For example, in a case where the technology of the present disclosure is applied for only operating the real object, the process step of arranging and operating the display object may be omitted. In addition, in a case where the technology of the present disclosure is applied for only operating the display object, the process step of recognizing and operating the real object may be omitted.

<4. Cooperation Between Plurality of Apparatuses>

The technology of the present disclosure may be achieved in cooperation between a plurality of operations. For example, a part of the operation control process described in the previous section may be performed by an apparatus different physically from the information processing apparatus 100.

FIG. 24 is an illustration diagram for illustrating cooperation between a plurality of apparatuses. With reference to FIG. 24, the information processing apparatus 100 as the HMD worn by the user, a server apparatus 200 communicating with the information processing apparatus 100, and the real object Ro1 are shown. The information processing apparatus 100 transmits the input image and the input sound to the server apparatus 200 (SIG1), for example. The server apparatus 200 is an information processing apparatus having functions of the recognition part 150 and control part 180 shown in FIG. 6. The server apparatus 200 executes the operation control process on the basis of the input image and input sound received from the information processing apparatus 100. A result of the process executed by the server apparatus 200 is provided to the information processing apparatus 100 (SIG2). The information processing apparatus 100 displays the output image on the screen on the basis of the process result received from the server apparatus 200, or transmits the remote control signal to the real object Ro1 (SIG3). The remote control signal may be transmitted not from the information processing apparatus 100 but from the server apparatus 200 to the real object Ro1 (SIG4). The server apparatus 200 may be arranged in a personal network or home network established in the vicinity of the user, for example, or arranged in a remote network including the Internet.

<5. Conclusion>

The various embodiments are described above using FIG. 1 to FIG. 24 according to an embodiment of the technology of the present disclosure. According to the above described embodiments, if there exists a single operation target operable by the user, the gesture area associated with the relevant single operation target is set in the large area available within the screen. If there exist a plurality of operation targets, the gesture area associated with at least one operation target is set on the basis of the reference positions of the relevant plurality of operation targets. In other words, the available screen area is allocated as the gesture area to each of a plurality of operation targets depending on the positional relationship between the operation targets. Then, the operation of each operation target is controlled via the gesture interface in the set gesture area. Therefore, the screen area accepting the gesture input is not limited to a narrow area so that the degree of freedom of the gesture input is improved. Further, multiple operations are allowed such as that a certain operation target is operated by making the gesture in a certain area within the angle of view, and that another operation target is operated by making the gesture in another area. As a result thereof, a special command for switching the operation target is not necessary and the user can freely operate a plurality of operation targets via a variety of gesture interfaces. In addition, since the gesture area is not limited to a narrow area, user is released from the burden of accurately pointing the operation target or the like. This is particularly useful for the gesture interface having difficulty in obtaining pointing accuracy comparable with other operation means including the touch sensor, mouse or the like.

Additionally, according to the above described embodiments, the indication for gesture interface supporting the user is displayed on the screen, such as the indication indicating the set gesture area, or the indication indicating the gesture available for operating the operation target. Therefore, the user can understand what gesture to make in which screen area by looking the indication. This promotes use of the gesture interface.

Further, according to the above described embodiments, in the case where the operation target is the real object, the reference position of the real object is decided based on the position of the real object in the screen. Therefore, with taking into account where in the user's field of vision the real object of the operation target exists, the gesture area for operating the relevant real object can be set. In the case where the real object is the remotely operable apparatus, the relevant real object can be remotely operated via the gesture interface. If the virtual operation is defined for the real object, the virtual operation can be called via the gesture interface.

Moreover, according to the above described embodiment, in the case where the operation target is the display object displayed on the screen, the reference position of the display object is specified by the user when the relevant display object is displayed. Therefore, with taking into account arrangement of the display object the user wishes, the gesture area for operating the display object can be set. Then, the display object can be operated via the gesture interface in the set gesture area.

Note that a series of control processes by the apparatuses explained in this description may be achieved by any of software, hardware, and combination of software and hardware. A program included in software is stored in advance in, for example, a storage medium provided inside or outside the apparatus. Then, the program is read into a RAM (Random Access Memory) when executed and executed by the processor such as the CPU.

It should be understood by those skilled in the art that various modifications, combinations, sub-combinations and alterations may occur depending on design requirements and other factors insofar as they are within the scope of the appended claims or the equivalents thereof.

The present technology may also be configured as below.

(1) An information processing apparatus, comprising: circuitry configured to provide a user interface to control a plurality of controllable objects, the user interface being associated with a gesture recognition area that is defined by a predetermined detection area of a sensor, the gesture recognition area being divided into a plurality of gesture recognition sub-areas based on a number of the controllable objects to be controlled by the user interface, detect a predetermined gesture within the predetermined detection area, determine the gesture recognition sub-area in which the predetermined gesture is detected, and perform an operation on one of the controllable objects based on the detected predetermined gesture and the determined gesture recognition sub-area in which the predetermined gesture is detected.

(2) The information processing apparatus of (1), wherein the one of the controllable objects is a remote controllable device which is assigned to the determined gesture recognition sub-area, and the circuitry is further configured to perform the operation by sending a predetermined command from the information processing apparatus to the remote controllable device.

(3) The information processing apparatus of (1) or (2), wherein the circuitry is further configured to allocate, for each of the gesture recognition sub-areas, a sub-region of the gesture recognition area based on a center position of the controllable object corresponding to the respective gesture recognition sub-area.

(4) The information processing apparatus of any one of (1) to (3), wherein the circuitry is further configured to provide an indication of at least one candidate gesture and associated candidate operation for one of the controllable objects.

(5) The information processing apparatus of any one of (1) to (4), wherein the circuitry is further configured to provide a menu that includes a plurality of items to be selected by a user, the menu is associated with a real controllable object in one of the gesture recognition sub-areas and displayed on a display, and one of the items is selected based on the predetermined gesture in the one of the gesture recognition sub-areas assigned to the real controllable object.

(6) The information processing apparatus of any one of (1) to (5), wherein the circuitry is further configured to provide a visual indication of the gesture recognition sub-area in which the predetermined gesture is detected.

(7) The information processing apparatus of (6), wherein the visual indication of the gesture recognition sub-area is displayed on a display, and the circuitry is further configured to provide a mark indicating one of the controllable objects as a target of the operation on the display.

(8) The information processing apparatus of any one of (1) to (7), further comprising: a display implemented in a head-mounted display unit and configured to present the user interface to a user.

(9) The information processing apparatus of any one of (1) to (8), wherein the plurality of controllable objects includes a virtual object assigned to a first one of the gesture recognition sub-areas and a real object assigned to a second one of the gesture recognition sub-areas, and the circuitry is further configured to provide the user interface to control the virtual object displayed on a display and the real object which is recognized based on an image captured by the sensor at the same time.

(10) The information processing apparatus of any one of (1) to (9), wherein the sensor is a camera.

(11) The information processing apparatus of any one of (1) to (10), wherein the plurality of controllable objects includes a real object, and the circuitry is further configured to set one of the gesture recognition sub-areas based on recognition of a location of the real object.

(12) The information processing apparatus of (11), wherein the circuitry is further configured to provide the user interface as an overlay superimposed over a user's view of the real object.

(13) The information processing apparatus of any one of (1) to (12), wherein the circuitry is further configured to set a boundary between two of the gesture recognition sub-areas based on relative locations of the controllable objects associated with the two gesture recognition sub-areas.

(14) The information processing apparatus of any one of (1) to (13), wherein the circuitry is further configured to set one of the gesture recognition sub-areas with priority being given to real objects.

(15) The information processing apparatus of any one of (1) to (14), wherein the plurality of controllable objects are prioritized, each of the controllable objects is assigned to one of the gesture recognition sub-areas, and a size of a gesture recognition sub-area associated with a controllable object with a first priority is set larger than that of another gesture recognition sub-area associated with a controllable object having a second priority that is lower than the first priority.

(16) The information processing apparatus of any one of (1) to (15), wherein the circuitry is further configured to divide the gesture recognition area into the plurality of gesture recognition sub-areas based on a predetermined reference position of each of the controllable objects.

(17) The information processing apparatus of any one of (1) to (16), wherein the circuitry is further configured to merge two of the gesture recognition sub-areas or remove one of the gesture recognition sub-areas when another predetermined gesture is detected.

(18) The information processing apparatus of any one of (1) to (17), wherein when only one controllable object is associated with the gesture recognition area, the gesture recognition sub-area is equal to the gesture recognition area.

(19) An information processing system, comprising: circuitry configured to provide a user interface to control a plurality of controllable objects, the user interface being associated with a gesture recognition area that is defined by a predetermined detection area of a sensor, the gesture recognition area being divided into a plurality of gesture recognition sub-areas based on a number of the controllable objects to be controlled by the user interface, detect a predetermined gesture within the predetermined detection area, determine the gesture recognition sub-area in which the predetermined gesture is detected, and perform an operation on one of the controllable objects based on the detected predetermined gesture and the determined gesture recognition sub-area in which the predetermined gesture is detected.

(20) A method of an information processing apparatus for controlling a plurality of controllable objects, the method comprising: providing, by circuitry of the information processing apparatus, a user interface to control the plurality of controllable objects, the user interface being associated with a gesture recognition area that is defined by a predetermined detection area of a sensor, the gesture recognition area being divided into a plurality of gesture recognition sub-areas based on a number of the controllable objects to be controlled by the user interface; detecting a predetermined gesture within the predetermined detection area; determining the gesture recognition sub-area in which the predetermined gesture is detected; and performing, by the circuitry of the information processing apparatus, an operation on one of the controllable objects based on the detected predetermined gesture and the determined gesture recognition sub-area in which the predetermined gesture is detected.

(21) A non-transitory computer-readable storage medium storing instructions which, when executed by a computer, cause the computer to perform a method for controlling a plurality of controllable objects, the method comprising: providing, by the computer, a user interface to control the plurality of controllable objects, the user interface being associated with a gesture recognition area that is defined by a predetermined detection area of a sensor, the gesture recognition area being divided into a plurality of gesture recognition sub-areas based on a number of the controllable objects to be controlled by the user interface; detecting a predetermined gesture within the predetermined detection area; determining the gesture recognition sub-area in which the predetermined gesture is detected; and performing, by the computer, an operation on one of the controllable objects based on the detected predetermined gesture and the determined gesture recognition sub-area in which the predetermined gesture is detected.

(22) An information processing apparatus including:
a control part configured to control an operation of at least one operation target using at least one gesture area, the at least one gesture area being set in a screen based on reference positions of a plurality of operation targets in the screen, and being associated with the at least one operation target, the plurality of operation targets being operable by a user.

(23) The information processing apparatus according to (22), wherein the control part displays, on the screen, an indication indicating the gesture area.

(24) The information processing apparatus according to (22) or (23), wherein the control part displays, on the screen, an indication indicating a gesture available for operating the at least one operation target.

(25) The information processing apparatus according to any one of (22) to (24), wherein the plurality of operation targets each include a real object existing in a real space, and
wherein the reference position of the real object is decided based on a position of the real object in the screen.

(26) The information processing apparatus according to any one of (22) to (25),
wherein the plurality of operation targets each include a display object displayed on the screen, and
wherein the reference position of the display object is specified by the user when the display object is displayed.

(27) The information processing apparatus according to (26),
wherein the display object is displayed in response to a voice command issued by the user, and
wherein the reference position of the display object is decided based on a position of an operation body in the screen at a time when the voice command is recognized.

(28) The information processing apparatus according to (25), wherein the gesture area set in association with the real object remains in the screen after the real object moves out of the screen.

(29) The information processing apparatus according to (25), wherein the real object is a remotely operable apparatus, and
wherein, in a case where a gesture of the user is recognized in the gesture area associated with the remotely operable apparatus, the control part transmits a remote operation signal corresponding to the recognized gesture to the remotely operable apparatus.
(30) The information processing apparatus according to (25),
wherein the real object is an object for which a virtual operation is defined, and wherein, in a case where a gesture of the user is recognized in the gesture area associated with the object, the control part displays the virtual operation corresponding to the recognized gesture on the screen.
(31) The information processing apparatus according to (26) or (27),
wherein the display object is displayed due to execution of an application, and wherein, in a case where a gesture of the user is recognized in the gesture area associated with the display object, the control part causes the application to execute an application process corresponding to the recognized gesture.
(32) The information processing apparatus according to any one of (22) to (31), wherein the control part sets a first gesture area associated with a first operation target having a first reference position and a second gesture area associated with a second operation target having a second reference position by partitioning an angle of view along a boundary passing between the first reference position and the second reference position.
(33) The information processing apparatus according to (32), wherein a direction of the boundary is decided depending on a positional relationship between the first reference position and the second reference position.
(34) The information processing apparatus according to any one of (22) to (31), wherein the control part sets a first gesture area associated with a first operation target having a first reference position and a second gesture area associated with a second operation target having a second reference position by evenly partitioning an angle of view and allocating areas after partition to the first operation target and the second operation target depending on a positional relationship between the first reference position and the second reference position.
(35) The information processing apparatus according to any one of (22) to (31), wherein the control part sets a first gesture area associated with a first operation target having a first reference position, and thereafter, sets a second gesture area associated with a second operation target having a second reference position based on the first reference position and the second reference position.
(36) The information processing apparatus according to any one of (22) to (31), wherein the control part sets a first gesture area associated with a first operation target having a first reference position based on the first reference position and a second reference position of a second operation target which has higher priority.
(37) The information processing apparatus according to any one of (32) to (36), wherein, in a case where the user specifies one of the first operation target and the second operation target, the control part merges a gesture area for the other not specified operation target into a gesture area for the specified operation target.
(38) The information processing apparatus according to any one of (22) to (37), wherein, in a case where a single operation target exists, the control part sets a gesture area associated with the single operation target across a whole of an available area in the screen, and in a case where the plurality of operation targets exist, the control part sets gesture areas associated with the plurality of operation targets based on the reference positions of the plurality of operation targets.
(39) The information processing apparatus according to any one of (22) to (37), wherein the screen is worn on a head of the user.
(40) An operation control method executed by an information processing apparatus, the operation control method including:
controlling an operation of at least one operation target using at least one gesture area, the at least one gesture area being set in a screen based on reference positions of a plurality of operation targets in the screen and being associated with the at least one operation target, the plurality of operation targets being operable by a user.
(41) A program causing a computer that controls an information processing apparatus to function as:
a control part configured to control an operation of at least one operation target using at least one gesture area, the at least one gesture area being set in a screen based on reference positions of a plurality of operation targets in the screen and being associated with the at least one operation target, the plurality of operation targets being operable by a user.

REFERENCE SIGNS LIST 100 information processing apparatus
150 recognition part
180 control part
200 server apparatus (information processing apparatus)
RP1, RP2, RP3, RP4, RP5 reference position
GA1, GA2, GA3, GA4, GA5 gesture area

The invention claimed is:
1. An information processing apparatus, comprising:
circuitry configured to:
control a plurality of controllable objects via a user interface, wherein each of the plurality of controllable objects is one of a real object or a virtual object,
associate the user interface with a gesture recognition area that is defined by a detection area of a sensor,
divide the gesture recognition area into a plurality of gesture recognition sub-areas, based on a detection of the plurality of controllable objects controlled by the user interface and a presence of a reference position corresponding to each of the plurality of controllable objects,
assign a priority to each of the plurality of controllable objects based on each of the plurality of controllable objects is one of the real object or the virtual object,
wherein:
a first gesture recognition sub-area of the plurality of gesture recognition sub-areas is associated with a first controllable object of the plurality of controllable objects and a second gesture recognition sub-area of the plurality of gesture recognition sub-areas is associated with a second controllable object of the plurality of controllable objects, and
a first priority associated with the first controllable object is greater than a second priority associated with the second controllable object,
adjust a first size of the first gesture recognition sub-area and a second size of the second gesture recognition sub-area based on the first priority and the second priority, respectively, such that the first size is larger than the second size,
detect a gesture within the detection area,
determine one of the plurality of gesture recognition sub-areas in which the gesture is detected, and
execute an operation on one of the plurality of controllable objects based on the detected gesture in the determined one of the plurality of gesture recognition sub-areas.

2. The information processing apparatus according to claim 1, wherein the circuitry is further configured to:
assign the one of the plurality of controllable objects to the one of the plurality of gesture recognition sub-areas, wherein the one of the plurality of controllable objects is a remote controllable device, and
execute the operation based on a command transmitted by the information processing apparatus to the remote controllable device.

3. The information processing apparatus according to claim 1, wherein the circuitry is further configured to allocate, for each of the plurality of gesture recognition sub-areas, a sub-region of the plurality of gesture recognition sub-areas based on a center position of each of the plurality of controllable objects corresponding to each of the plurality of gesture recognition sub-areas.

4. The information processing apparatus according to claim 1, wherein the circuitry is further configured to:
indicate at least one candidate gesture, and
associate a candidate operation for one of the plurality of controllable objects based on the candidate gesture.

5. The information processing apparatus according to claim 1, wherein the circuitry is further configured to:
display a menu on a display screen of the information processing apparatus, wherein:
the menu includes a plurality of selectable items, and
the menu is associated with the real object of the plurality of controllable objects present in the one of the plurality of gesture recognition sub-areas, and
select one of the plurality of items based on the detected gesture in the one of the plurality of gesture recognition sub-areas assigned to the real object.

6. The information processing apparatus according to claim 1, wherein the circuitry is further configured to control a display screen to display a visual indication of the one of the plurality of gesture recognition sub-areas based on the detection of the gesture.

7. The information processing apparatus according to claim 6, wherein the circuitry is further configured to:
control the display screen to display the visual indication of the one of the plurality of gesture recognition sub-areas, and
control the display screen to display a mark on the one of the plurality of controllable objects, wherein the mark on the one of the plurality of controllable objects indicates that the one of the plurality of controllable objects is a target of the operation on the display screen.

8. The information processing apparatus according to claim 1, further comprising:
a display screen implemented in a head-mounted display unit, wherein the display screen is configured to present the user interface.

9. The information processing apparatus according to claim 1, wherein:
the plurality of controllable objects includes the virtual object assigned to a third gesture recognition sub-area of the plurality of gesture recognition sub-areas, and
the real object assigned to a fourth gesture recognition sub-area of the plurality of gesture recognition sub-areas, and
the circuitry is further configured to control the virtual object and the real object via the user interface, wherein the real object is recognized based on an image captured by the sensor.

10. The information processing apparatus according to claim 1, wherein the sensor is a camera.

11. The information processing apparatus according to claim 1, wherein:
the plurality of controllable objects includes the real object, and
the circuitry is further configured to set one of the plurality of gesture recognition sub-areas based on a recognition of a location of the real object.

12. The information processing apparatus according to claim 11, wherein the circuitry is further configured to superimpose the user interface over a user view of the real object.

13. The information processing apparatus according to claim 1, wherein the circuitry is further configured to set a boundary of each of the plurality of gesture recognition sub-areas based on relative locations of the plurality of controllable objects associated with each of the plurality of gesture recognition sub-areas.

14. The information processing apparatus according to claim 1,
wherein the circuitry is further configured to set the one of the plurality of gesture recognition sub-areas with a priority based on the real object of the plurality of controllable objects is in one of the plurality of gesture recognition sub-areas.

15. The information processing apparatus according to claim 1, wherein the circuitry is further configured to:
detect a plurality of gestures within the detection area;
merge each of the plurality of gesture recognition sub-areas based on the detection of a first gesture of the plurality of gestures; and
remove at least one of the plurality of gesture recognition sub-areas based on the detection of a second gesture of the plurality of gestures.

16. The information processing apparatus according to claim 1, wherein the circuitry is further configured to determine the reference position of each of the plurality of controllable objects based on a position of each of the plurality of controllable objects within a display screen.

17. A method, comprising:
controlling, by circuitry of an information processing apparatus, a plurality of controllable objects via a user interface, wherein each of the plurality of controllable objects is one of a real object or a virtual object,
associating the user interface with a gesture recognition area that is defined by a detection area of a sensor,
dividing the gesture recognition area into a plurality of gesture recognition sub-areas, based on a detection of the plurality of controllable objects controlled by the user interface and a presence of a reference position corresponding to each of the plurality of controllable objects;
assigning a priority to each of the plurality of controllable objects based on each of the plurality of controllable objects is one of the real object or the virtual object, wherein:
a first gesture recognition sub-area of the plurality of gesture recognition sub-areas is associated with a first controllable object of the plurality of controllable objects and a second gesture recognition sub-area of the plurality of gesture recognition sub-areas is associated with a second controllable object of the plurality of controllable objects, and a first priority associated with the first controllable object is greater than a second priority associated with the second controllable object, adjusting a first size of the first gesture recognition sub-area and a second size of the second gesture recognition sub-area based on the first priority and the second priority, respectively, such that the first size is larger than the second size, detecting a gesture within the detection area;

determining one of the plurality of gesture recognition sub-areas in which the gesture is detected; and executing, by the circuitry of the information processing apparatus, an operation on one of the plurality of controllable objects based on the detected gesture in the determined one of the plurality of gesture recognition sub-areas.

18. A non-transitory computer-readable medium having stored thereon computer-executable instructions which when executed by a computer, cause the computer to execute operations, the operations comprising:

controlling a plurality of controllable objects via a user interface, wherein each of the plurality of controllable objects is one of a real object or a virtual object, associating the user interface with a gesture recognition area that is defined by a detection area of a sensor, dividing the gesture recognition area into a plurality of gesture recognition sub-areas, based on a detection of the plurality of the controllable objects controlled by the user interface and a presence of a reference position corresponding to each of the plurality of controllable objects;

assigning a priority to each of the plurality of controllable objects based on each of the plurality of controllable objects is one of the real object or the virtual object, wherein:

a first gesture recognition sub-area of the plurality of gesture recognition sub-areas is associated with a first controllable object of the plurality of controllable objects and a second gesture recognition sub-area of the plurality of gesture recognition sub-areas is associated with a second controllable object of the plurality of controllable objects, and a first priority associated with the first controllable object is greater than a second priority associated with the second controllable object, adjusting a first size of the first gesture recognition sub-area and a second size of the second gesture recognition sub-area based on the first priority and the second priority, respectively, such that the first size is larger than the second size, detecting a gesture within the detection area;

determining one of the plurality of gesture recognition sub-areas in which the gesture is detected; and executing an operation on one of the plurality of controllable objects based on the detected gesture in the determined one of the plurality of gesture recognition sub-areas.

* * * * *